United States Patent [19]

Mori et al.

[11] Patent Number: 4,918,537

[45] Date of Patent: Apr. 17, 1990

[54] IMAGE FORMING APPARATUS

[75] Inventors: Hiroshi Mori, Ichikawa; Toshiaki Kobayashi, Tenri; Mitsuru Ogura, Nara; Shougo Iwai, Yamatokoriyama, all of Japan

[73] Assignee: Sharp Kabushiki Kaisha, Osaka, Japan

[21] Appl. No.: 293,809

[22] Filed: Jan. 5, 1989

[30] Foreign Application Priority Data

Jan. 13, 1988 [JP] Japan .................................. 63-5280
Mar. 24, 1988 [JP] Japan .................................. 63-71152

[51] Int. Cl.4 ....................... G02F 1/13; G01D 15/06; H04N 1/29

[52] U.S. Cl. ............................... 358/300; 350/350 S; 346/153.1

[58] Field of Search ............... 358/296, 300, 302, 298, 358/283, 285, 455–460, 474, 494, 496; 350/331 R, 350 R, 350 S, 330; 346/108, 107 R, 160, 153.1

[56] References Cited

U.S. PATENT DOCUMENTS 4,315,684 2/1982 Sugiura et al. .................. 355/14 R
4,743,974 5/1988 Lockwood .......................... 358/296

FOREIGN PATENT DOCUMENTS 483543 1/1973 Japan .

OTHER PUBLICATIONS

"Laser Addressed Liquid Crystal Light Modulators for Color Electronic Imaging with Mead Microencapsulated Paper", Charles Davis, SID Digest, 1987, pp. 367–370.

*Primary Examiner*—Bruce A. Reynolds
*Assistant Examiner*—Scott A. Rogers
*Attorney, Agent, or Firm*—Birch, Stewart, Kolasch & Birch

[57] ABSTRACT

An image forming apparatus includes an original document reader for respectively reading the each duplex face of the document from each side face; a means for filling-in the document images read respectively, with elements capable of being filled-in with laser heat through an electric-heat optical effect a device for optically reading each of the document images filled-in on the elements to focus the images on a photoelectric member; and a device for projecting the images onto a photosensitive member and to transfer them onto transfer paper, whereby both side faces of the original document are reproduced.

37 Claims, 17 Drawing Sheets

Fig. 10
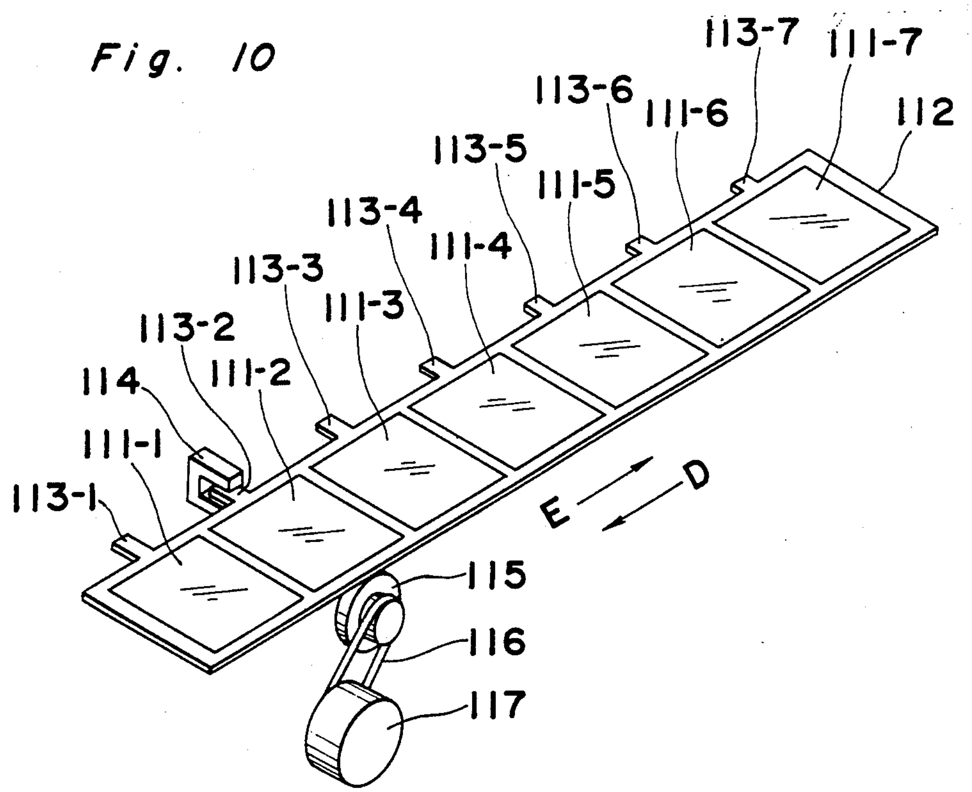
Fig. 14 (A)
Fig. 14 (C)
Fig. 14 (B)
Fig. 14 (D)

*Fig. 16*

| | | | |
|---|---|---|---|
| M1 | paper sheet size | number of copy paper sheets | F1 |
| M2 | paper sheet size | number of copy paper sheets | F2 |
| M3 | paper sheet size | number of copy paper sheets | F3 |
| M4 | paper sheet size | number of copy paper sheets | F4 |
| M5 | paper sheet size | number of copy paper sheets | F5 |
| M6 | paper sheet size | number of copy paper sheets | F6 |
| M7 | paper sheet size | number of copy paper sheets | F7 |

Fig. 17(A)-I

Fig. 17(A)-II
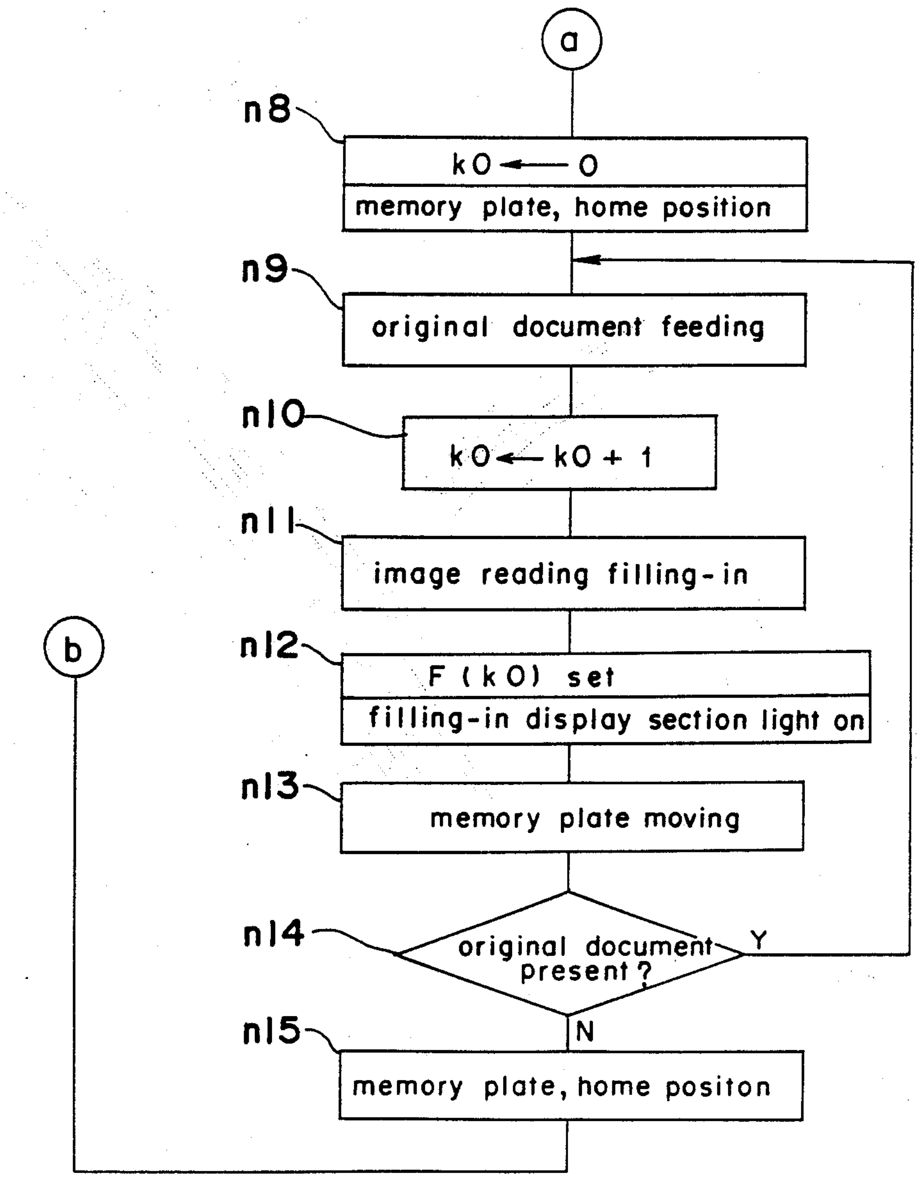

IMAGE FORMING APPARATUS

BACKGROUND OF THE INVENTION

The present invention generally relates to an image forming apparatus. More particularly, it relates to a novel image forming apparatus using a means for respectively reading the duplex faces of an original document and an element having an electric-heat optical effect. Further, it relates to a novel image forming apparatus for filling in image information of a plurality of types of images in a plurality of image filling-in sections, so as to proceed with a process of image forming.

Generally, the conventional image forming apparatus for respectively reading the duplex faces of an original document which transfer the document images onto a transfer paper sheet (for example, the front face and the reverse face of one sheet of transfer paper) is to copy one side face of the original document onto the single face of the transfer paper sheet. This is done through an image forming process composed of exposing, developing, transferring, and fixing steps. Then, the original document is reversed by an RDH apparatus, to simultaneously reverse, transport the transfer paper sheet by the duplex apparatus so as to carry out the image forming process again for copying the other side face of the original document onto the reverse face of the transfer paper sheet.

However, in the conventional image forming apparatus, an optical system for exposing the original document images on an exposure member is composed of an optical apparatus for effecting a slit exposing operation. Also, as a document reversing apparatus such as RDH or a similar apparatus is required, the defects of the conventional apparatus are as follows.

(1) As the document of B5 or A4 size or a similar size is comparatively large in size, only a slit exposure is required so as to expose a sufficient amount of light on the exposure member with a small lens. This occurs so that the image forming speed is not too high.

(2) As a document reversing apparatus such as RDH or a similar apparatus is required, the construction of a document processing section is made larger in scale. As the document is to be transported twice with respect to the document reading section, more time is taken for the document reading, with a high ratio probability that jamming will occur during the document transportation.

In an image forming apparatus such as a conventional copying machine or a similar apparatus, paper sheets with images formed on them are arranged so as to be discharged in order, side by side, and edition by edition, so as to simplify the later processing when a plurality of image paper sheets are formed by plural editions. Therefore, two discharging methods are considered for the apparatus as follows.

(3) One of the methods is to divide the number of editions in the paper-sheet discharging section. One page of document information is to have images formed by the number of the editions, so that they are discharged respectively into the different paper-discharge trays by a sorter. Thereafter, the next page thereof is to have images formed by the number of the editions, so that they are placed on the previous paper-sheet. Through the repetition, one sheet of paper with images formed in it is accumulated one by one on the respective discharge-paper trays.

(4) The other method is to have images formed for each edition. By the use of an automatic feed apparatus for document circulation, as disclosed in U.S. Pat. No. 4,076,408, which is adapted to circulate the document, a plurality of documents are circulated by the number of the required editions so as to form the images in accordance with the document in the course of the circulation. The images are formed one by one, so that a plurality of image-formed paper sheets are accumulated on one stage of the tray.

In an image forming apparatus for forming images on a plurality of copies by the use of a sorter as shown in (3), several bins of discharge paper trays are required to be provided. This creates a disadvantage of a larger apparatus, and a complicated paper-sheet discharge control. Also, in an image forming apparatus using an automatic feed for the document circulation as shown in (4), the document is circulated by the number of the editions, such that the document is likely to be damaged and the probability of causing jamming becomes higher.

SUMMARY OF THE INVENTION

Accordingly, an object of the present invention is to provide an improved image forming apparatus, which is fast in speed and simple in construction, by the use of elements having an electric-heat optical effect.

Another object of the present invention is to provide an image forming apparatus of the above described type, which is capable of effecting a high-speed processing operation even when the image forming operation for a plurality of copies is effected by the use of a plurality of image fill-in sections in which image information is filled-in.

In accomplishing these and other objects, according to one embodiment of the present invention, there is provided an image forming apparatus which includes an original document reading means for respectively reading the duplex face of the document from the side of each face; a means for filling-in, on the application of laser heat, the document images read respectively on elements capable of being filled-in with laser heat through the electric-heat optical effect; a means for optically reading each of the document images filled-in on the elements to focus into the images on a photoelectric member; and a means for showing the images on the photosensitive member to transfer them onto the transfer paper.

In the image forming apparatus of the present invention, the duplex face of the original document is read separately by the document reading means. An image sensor such as a CCD or similar sensor is used as a document reading means. The document images thus read may be stored on the memory or the like as electrical signals. The document images may be filled in with respect to elements which have electric-heat optical elements and are capable of being filled in with the laser heat. There is a smectic liquid crystal element to be described later which is an element capable of being filled-in with the laser heat through the electric-heat optical effect. As the document images filled in on the element may be optically read, the document images are read by the use of the optical apparatus so as to focus into images on the photosensitive member. The focused document images are transferred onto the transfer paper sheet as in the conventional image forming apparatus. Accordingly, in the above-described construction, the documents are not required to be reversed, because the duplex faces of the document placed on the document platform are read respectively from each face side by the document reading means. Namely, when the document has only been passed through the document reading section, once both duplex sides of the original document are read. As the original document images are filled in with the laser with respect to elements (which may be filled in with the laser heat through the electric-heat optical effect), it is possible to contrast the original document images so as to be filled in on the element. Accordingly, in order to optically read the contrasted original document images to focus into images on the photosensitive member, it makes it possible to expose the original document images in the full face at one time. Namely, the slit exposure is not required to be effected. Thus, the image forming speed may be made higher.

Also, there is provided an image forming apparatus, which includes a plurality of image filling-in sections composed of elements capable of being filled in with heat or light; a moving means for movably supporting these image filling-in sections; a filling-in means for filling in image information in the plurality of image filling-in sections; and an optical means for optically reading the image information of the image filling-in sections so as to focus into images on the photosensitive material.

In the image forming apparatus of the present invention, the image filling-in section is composed of elements, which are nematic.cholesteric mixture-liquid elements to be described later as elements capable of being thermally filled-in, or elements (Japanese Laid-Open Patent Publication Tokkaisho No. 48-3543) with photoconductive layer and liquid crystal made of amorphous silicone, selenium, organic material, and so on being laminated, as elements capable of being optically filled in. A plurality of filling-in sections are provided and are movably supported by the moving means. This occurs such that one from among a plurality of image filling-in sections is moved into the position opposite of the image filling-in means or of the optical means when necessary. When the image filling-in section is moved into position opposite of the image filling-in means, image information is filled-in on the image filling-in section. When it is moved into the position opposite of the optical means, the image information filled in on the element may be optically read, so that the image information of the image filling-in section is read by the optical means so as to focus into images on the photosensitive material. The focused image information is transferred onto a copy paper sheet as in the conventional image forming apparatus.

Accordingly, in the above-described construction, a plurality of image filling-in sections are provided. The image filling-in sections each having the image information of one page filled in on it are read by the optical means while being circulated so as to form the images, so that the images are continuously formed for each edition in the whole page. At this time, the image information filling-in into the image filling-in section has only to be effected once at first. Also, as the image information has only to be filled in with the laser with respect to the element capable of being thermally or optically filled in, it is possible to conctract the image information to fill in it. Accordingly, it is possible to expose the image filling-in section in the full face at one time, so as to read the image information filled-in on the image fill-in section to focus it into images on the photosensitive material.

Furthermore, it is possible to electrically process the document images which are optically read.

BRIEF DESCRIPTION OF THE DRAWINGS

These and other objects and features of the present invention will become clear from the following description taken in conjunction with the preferred embodiments thereof with reference to the accompanying drawings, in which:

FIG. 10 is a perspective view of a memory plate to be used for the copying machine thereof;

FIGS. 14(A) to 14(D) are views each showing the display example of the display section of the machine;

FIG. 16 is a graph showing a memory map of the machine; and

DETAILED DESCRIPTION OF THE INVENTION

Figure 1:
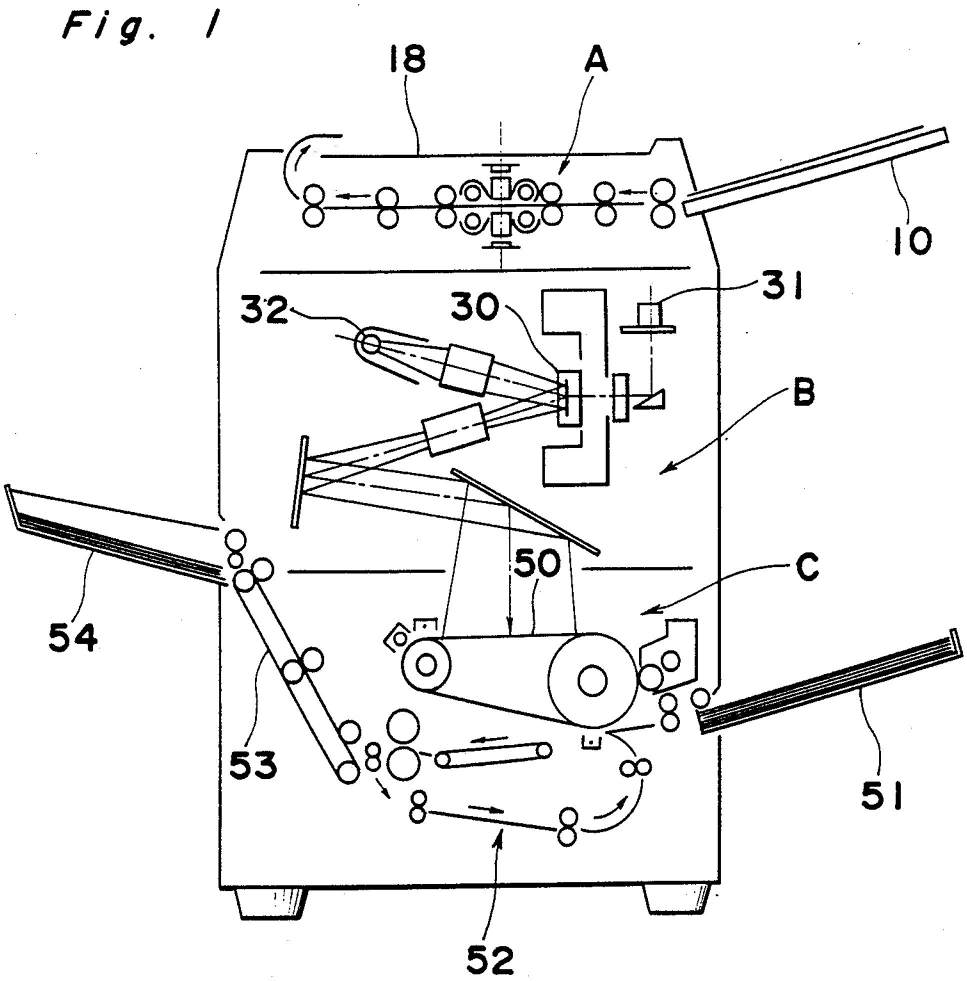
FIG. 1 shows a schematic view showing a construction of an image forming apparatus in a first embodiment of the present invention.

Before the description of the present invention proceeds, it is to be noted that like parts are designated by like reference numerals throughout the accompanying drawings.

First Embodiment:

(1) Construction of First Embodiment

Referring now to the drawings, there is shown in FIG. 1 an image forming apparatus according to a first embodiment of the present invention, which includes an original document processing section A, an optical system B including a smectic liquid crystal, and an image forming process section C. In the original document processing section A, an original document 11 is transported in the direction of an arrow (as shown) from an original document tray 10 so as to read the opposite surfaces of the original document by an original document reading sensor disposed on both the upper and lower sides of the original document. The document images on the opposite faces of the original document read by the original document reading sensor (image sensor) are then sent to the image memory and are transported as they are to the optical system B, or are transported thereto after optional processing has been effected. The optical system B includes a smectic liquid crystal element 30, a semiconductor laser apparatus 31, a light source 32 for applying visual lights upon the smectic liquid crystal element 30, and a reflection mirror for applying the reflection light from the smectic liquid crystal element 30 as an exposure light onto the image forming process section C. The smectic liquid crystal element has an electric-heat optical effect, as will be described later, so that the information may be filled in with laser heat so as to be optically read. The semiconductor laser apparatus 31 is a means for filling in information on the smectic liquid crystal element, i.e., original document images read by the image sensor. The light source 32, the lens system and the reflection mirror are means for optically reading the original document images filled in on the smectic liquid crystal element so as to make exposure on the photosensitive member of the image forming process section C. The image forming process section C includes a photoelectric member belt 50, a charger, a developing apparatus, a transferrer around the photosensitive member belt 50, and furthermore is provided with a duplex 52 for transporting the transport paper, fed from a paper sheet cassette 51, into the image forming process section again after the fixing. The transfer paper sheet already completed for the image forming process is discharged onto a discharge paper tray 54 by a transport belt 53.

(2) Construction of Original Document Processing Section

Figure 2:
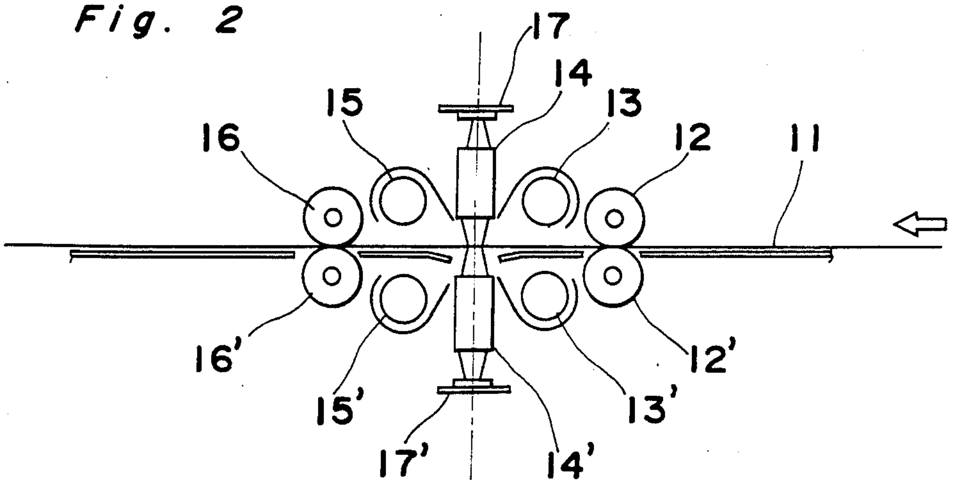
FIG. 2 is a schematic view of an original processing section of the apparatus A.

FIG. 2 is a construction portion of the original document processing section A. The original document 11 is transported in the direction of an arrow in the drawing from an original-document tray 10 shown in FIG. 1. Transport rollers 12, 12', first light-source lamps 13, 13' for illuminating the original document, lens arrays 14, 14', second light source lamps 15, 15' for illuminating the original document, and original document transport rollers 16, 16' are respectively disposed in order from the upstream side with respect to the original document transport direction, with image sensors 17, 17' for reading the original document images bing disposed above the lens arrays 14, 14'. The image sensor 17 is adapted to read the top face of the original document 11, while the image sensor 17' is adapted to read the reverse face thereof. The original document 11 is so arranged as to be discharged onto the original document discharge section 18 disposed on the top face of the image forming apparatus main body after it has been passed through the original document reading section.

By the above-described construction, one sheet of document is fed from the original document tray 10 in the original document processing section A, and is passed through the original document reading section and thereafter is discharged onto the document discharge section 18, such that both the upper and lower faces of the document are read once by the image sensors 17, 17'. The original document images on both the upper and lower faces which have been read are stored once in the memory of a control section (not shown).

(2) Construction of Optical System B

Figure 3:
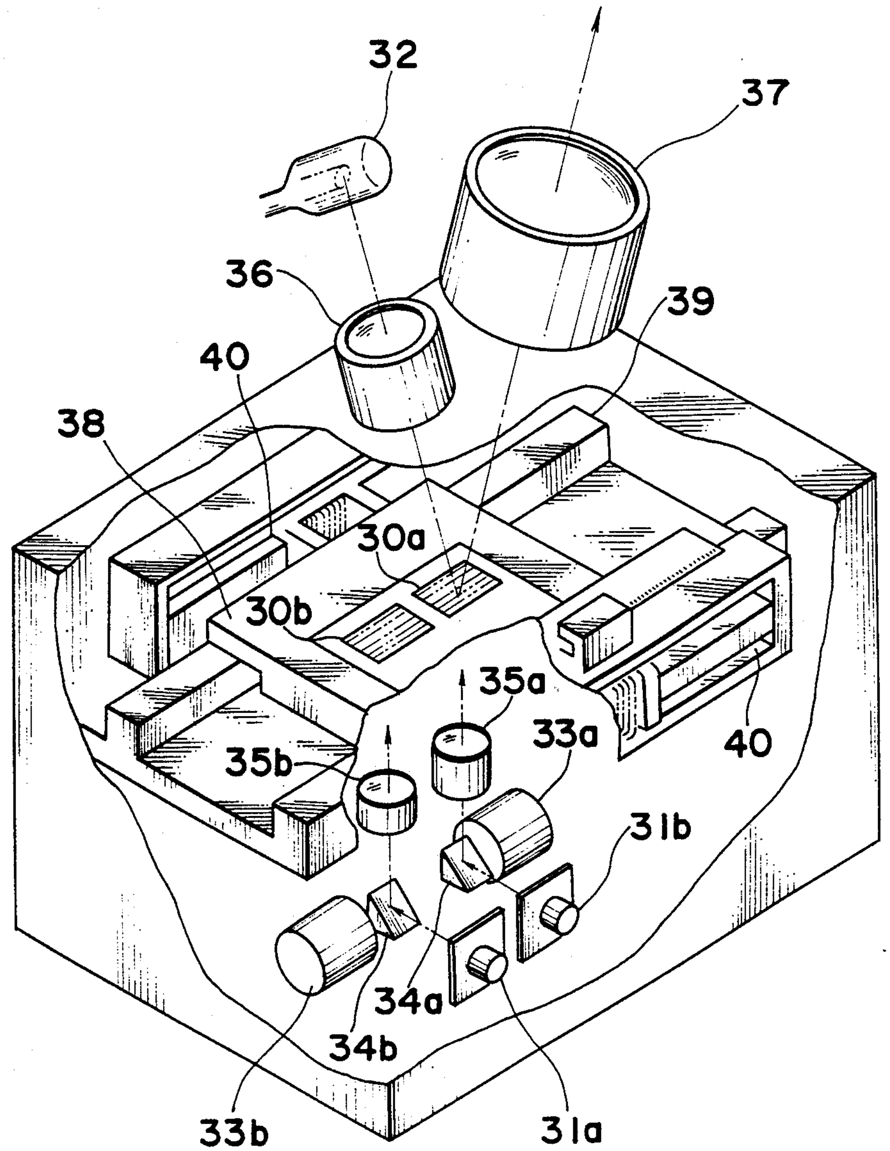
FIG. 3 is a perspective view of an optical system of the apparatus B.

FIG. 3 shows a construction view of the optical system B.

Figure 4:
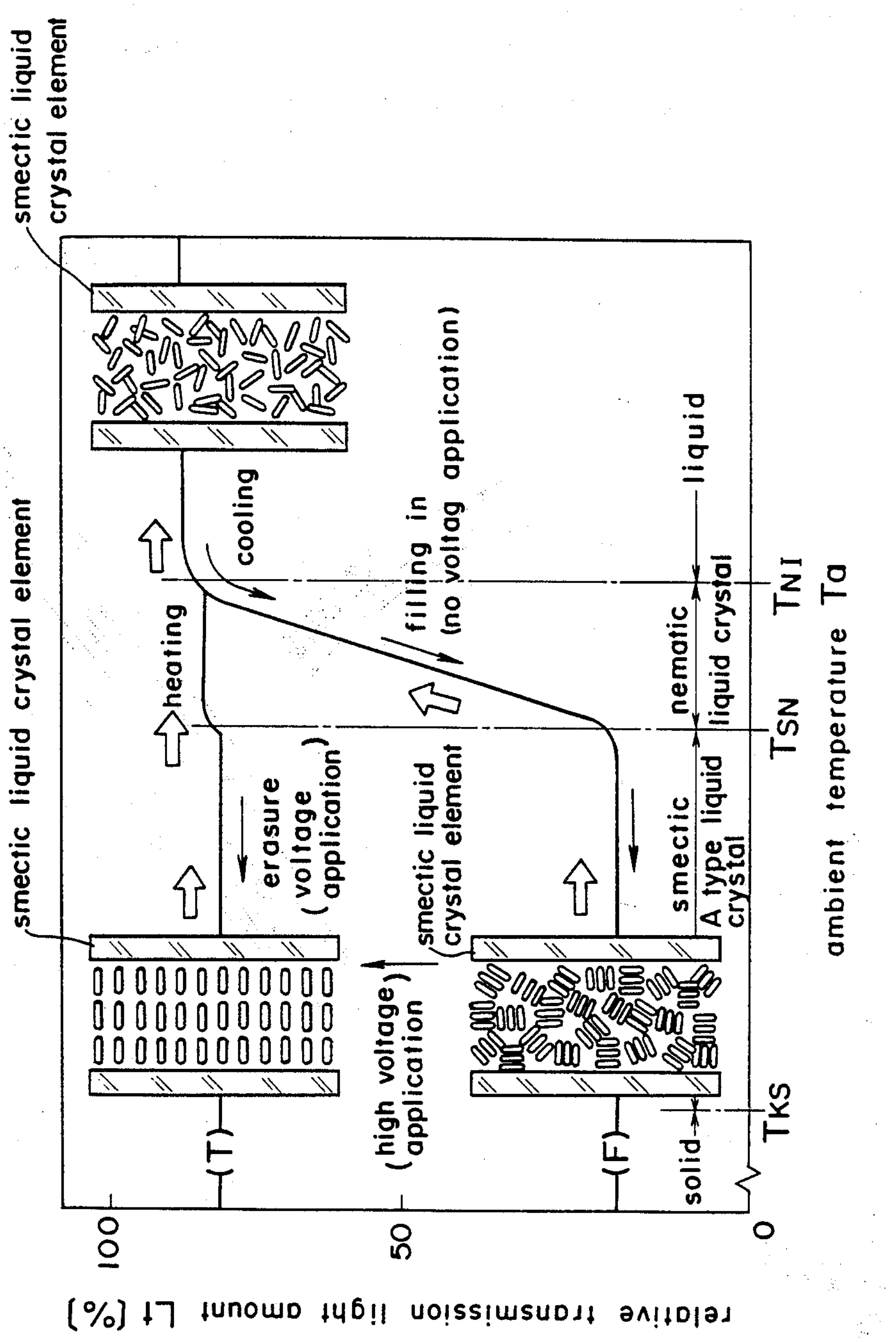
FIG. 4 is a graphic showing a thermoelectric optical characteristic of a smectic liquid crystal element of the apparatus.

A smectic liquid crystal element 30 is composed of a first smectic liquid crystal element 30*a* on which the original document images on the top face of the original document read by the image sensor 17 are filled in, and a second smectic liquid crystal element 30*b* on which the original document images on the under face of the original document read by the image sensor 17' are filled in. FIG. 4 shows thermoelectric optical characteristic of the smectic liquid crystal element.

(3') Electric Heat Optical Effect of Smectic Liquid Crystal Element

Fundamentally, the element is composed through an enclosure of smectic A type liquid crystal, having the positive dielectric constant anisotropy, between two glass basic plates. The electrode surface of the inner face of the basic plate is properly processed so as to have the liquid crystal molecule arranged (in the upper left portion) vertically on the basic plate face. The element becomes transparent in this condition. As the whole liquid crystal element is heated light by light, the transparency degree is slightly increased, thus resulting in saturation occurring soon (in the upper right portion). The orientation of the liquid crystal molecule within the liquid crystal element becomes completely random in this condition. Namely, the condition becomes one of the isotropy liquid, thus resulting in no liquid crystal. As the temperature of the liquid is lowered, the following two stable conditions are obtained.

(A) As they are cooled as they are, the molecules within the element partially gather into smectic shape (referred to as focal conic). As a result, the condition becomes opaque (in the upper left portion).

(B) As the element is cooled while a sufficiently high frequency voltage is being applied between the electrodes, the liquid crystal molecules come to be arranged vertically on an basic plate so as to be restored into the original smectic A condition. Namely, the elements become transparent. This is because the liquid crystal molecules are arranged in parallel relation on the application electric field, due to the fact that the molecules have the positive dielectric-constant anisotropy.

The condition of the above described (A) and (B) is retained, even after the voltage applied between the electrodes has been removed, so long as the ambient temperature of the liquid-crystal element is maintained for an indefinite time, but not to exceed the relative transfer temperature $T_{N1}$.

There are two methods of restoring the condition from the condition (opaque condition) of (F) in the drawing to the condition (transparent condition) of (T).

(C) After the liquid crystal has been turned into the liquid once through heating of the liquid crystal element again, it is cooled while the sufficiently high voltage is being applied between electrodes.

(D) The condition is forced to be restored from the condition of (F) to the condition of (T) by the application of an extremely high voltage between the electrodes. In this case, the liquid crystal element is kept at the ambient temperature.

Information (transparent or opaque) capable of being optically read may be filled in and erased by selectively effecting the voltage application and the heating with respect to the smectic liquid element from the above-described characteristics. The voltage may be selectively applied upon the optical picture element by the scanning operation of these electrodes, with the matrix electrode being disposed on the upper glass basic plate. Also, the heating operation may be effected upon the optical picture element by the use of the laser beam.

Figure 5:
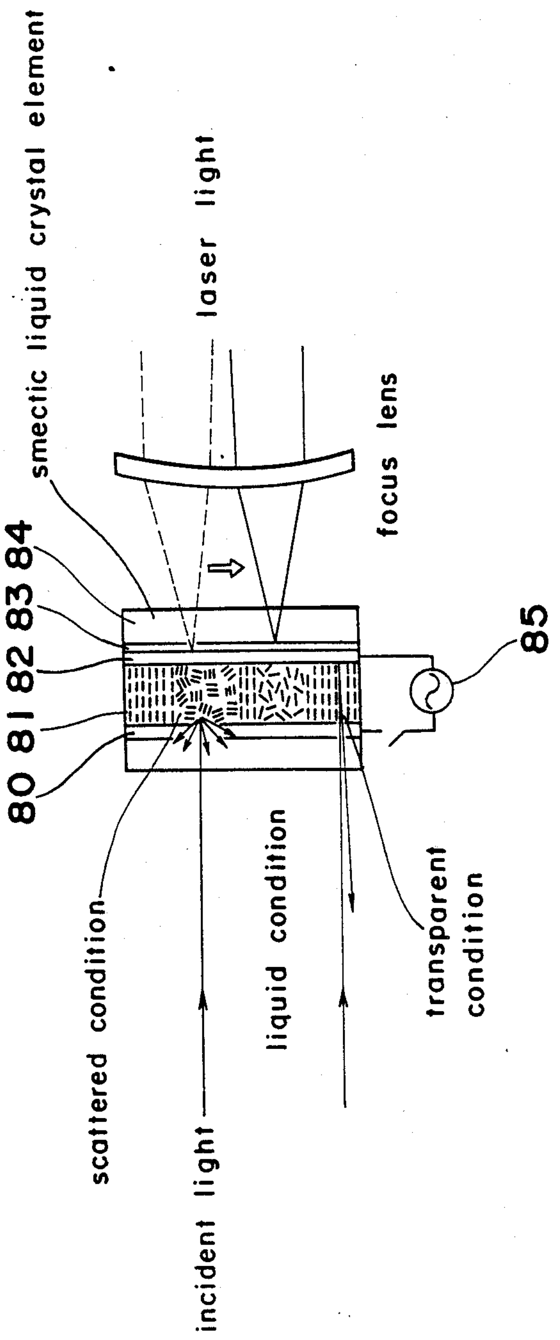
FIG. 5 is a schematic view of a smectic liquid crystal element of the apparatus.

FIG. 5 is a construction view of the smectic liquid crystal element 30. The liquid crystal is composed of two glass basic plates 84, a smectic liquid crystal layer 81 grasped between the two glass basic plates, a transparent electrode 80 disposed on the left side of it, an Al reflection film 82 disposed on the right side of the smectic liquid crystal layer 81, and $Cr_2O_3$ absorbing film 83, which is a laser beam absorbing film, disposed on the right side of it. The transparent electrode 80 and the Al reflection film 82 constitute a matrix electrode as in a known liquid crystal or similar display apparatus or the like. The scanning operation of the electrode is effected by the high-frequency voltage 85, with one being a scanning electrode, the other being a signal-portion electrode. The tolerance section of the scanning electrode and the signal portion electrode may be made of picture elements in this manner. The electric field may be applied, with respect to the optional picture element, by controlling the waveforms of the signals applied upon the electrodes. A semiconductor laser apparatus and a focusing lens are disposed on the right side of the liquid crystal element, so that an optical picture element may be heated by the laser beams. Accordingly, the heating operation of the optional picture element is effected by the scanning of the laser beams and the on/off operation of the laser beams.

The light to be incident from the left side is not reflected at a place, with the liquid crystal layer 81 being scattered. In places where the liquid crystal layer is in liquid condition and in the transparent condition, it reaches the Al reflection film 82, so that the light is reflected by the reflection film.

In FIG. 3, two semiconductor laser apparatuses 31*a*, 31*b* receive the image information from the control section so as to apply the laser light on and off, controlled in accordance with the image information. The laser beam is reflected by the mirrors 34*a*, 34*b* disposed on goniometers 33*a*, 33*b*, and is applied on the liquid crystal elements 30*a*, 30*b* through pickup lenses (focusing lenses) 35*a*, 35*b* having a focusing function. The goniometers 33*a*, 33*b* are provided to scan the laser beam.

A light source 32 and lenses 36, 37 are provided above the liquid crystal elements 30*a*, 30*b*. The liquid crystal elements 30*a*, 30*b* are secured onto a liquid crystal support stand 38, so that the liquid crystal support stand 38 is movable along a rail 39. A linear motor 40 is adapted to move the liquid crystal support stand 38 along the rails 39 so as to move either the liquid crystal element 30*a* or the liquid crystal element 30*b* onto the illumination section of the light source 32 through control of the motor. In the drawing, the liquid crystal element 30*a* is located on the illumination section of the light from the light source 32. The filling-in operation of the document images with respect to the liquid crystal elements 30*a*, 30*b*, and the applying operation of the light with respect to the document images to be filled in, are effected separately. This is because the information, once filled in on the liquid-crystal elements 30*a*, 30*b* is stored in memory as.

(4) Construction of Image Forming Process Section

Figure 6:
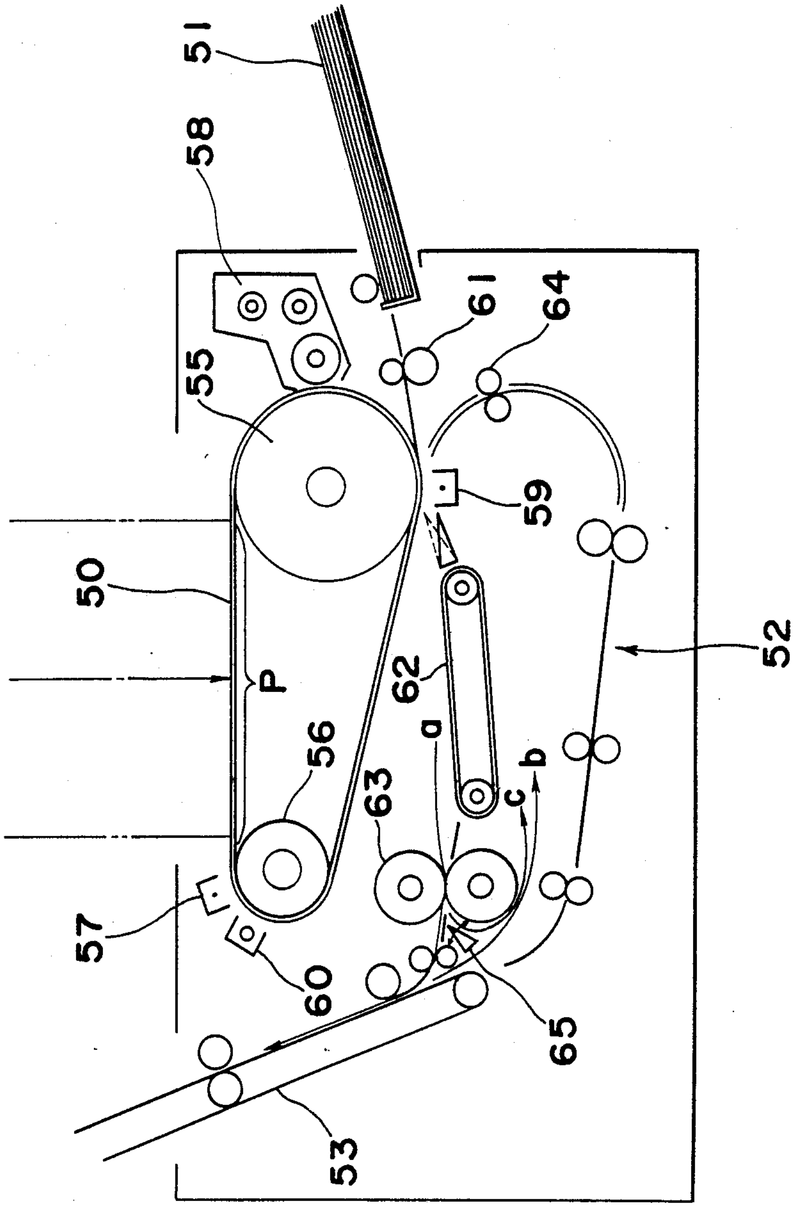
FIG. 6 is a schematic view of an image forming process of the apparatus C.

FIG. 6 shows a construction view of the image forming process section C. An endless photosensitive member belt 50 is entrained between two rollers 55, 56. The roller 55 is a driving roller coupled to a motor (not shown). A main charger 57, a developing apparatus 58, a transfer charger 59, and an electricity removing lamp 60 are disposed, as in an ordinary image forming apparatus, around the photosensitive member belt 50. The region P of the photosensitive member belt 50 shows an exposure one. The exposure region P exceeds at least the size of the copy images. The exposure lights reflected by the last reflection mirror of the optical system B are illuminated against the exposure region P, with the exposure lights being the entire-face exposure lights of the document images. Accordingly, exposing with respect to the exposure region P is effected for a given time period with the photosensitive member belt 50 remaining stationary. When the exposing is completed, the light source 32 of the optical system B is turned off and the photosensitive member belt 50 is driven and the transfer paper sheet is transported to the transfer position at the given time. The transfer paper sheet, after the transfer operation, is transported onto the fixing roller 63 through the transport belt 62 so as to be fixed. In the case of the one-side document, it is transported as it is onto the transport belt 53 and is discharged onto the discharge-paper tray 54. Namely, it is transported in accordance with the route "a" in the drawing. Also, it is transferred so far as the transfer belt 53 along the route "a" as in the one-side face document at the both-side copying mode, thereafter is transported in the direction opposite to previous direction and is fed into the duplex apparatus 52. Namely, it is transported along the route "b" after the route "a", and the timing is adjusted by the timing roller 64. It is fed to the transfer section again, with the second document images being copied onto the reverse face of the transfer paper sheet. It passes through a transfer belt 62, a fixing roller 63 and a transport belt 53 and is discharged onto the discharge paper tray 54. The above-described operation is effected in the both side copying mode. In the mode, when the first image forming process is carried out in the optical system B, a first liquid crystal element 30*a* is positioned in the illumination section from the light source 32, while a second liquid crystal element 30*b* is disposed on the illumination section when the second image forming process is carried out. Needless to say, the document images on both faces of the document are filled in on these liquid crystal elements 30*a*, 30*b* by the semiconductor laser apparatuses 31*a*, 31*b* independently of the image forming process.

In this embodiment, a composite copying mode may be executed. In this mode, the transfer paper sheets, already transferred in the original document images, each for one document side face, are directly transported onto the duplex apparatus after having passed through the fixing roller 63. The transport controlling is effected through counter-clockwise movement of a pawl 65 disposed at a paper sheet delivery section of the fixing roller 63. Namely, the transfer paper sheet is fed along the route "c". Thereafter, the transfer paper sheet is adjusted in timing by the timing roller 64 and is again fed into the transfer section, wherein the second original document images are compositely copied so as to be discharged onto the paper discharge tray 54 through the transport belt 62, the fixing roller 63, and the transport belt 53.

A copying operation may be effected in an optional mode among the ordinary one side face copying mode, the both side face copying mode, or the composite copying mode by the above-described operation with respect to one transfer paper sheet. It is to be noted that the image forming process speed may be made very high as compared with the conventional image forming apparatus, because the exposure for the original document images is an entire face exposure, instead of the slit exposure.

(5) Construction of Controlling Section

Figure 7:
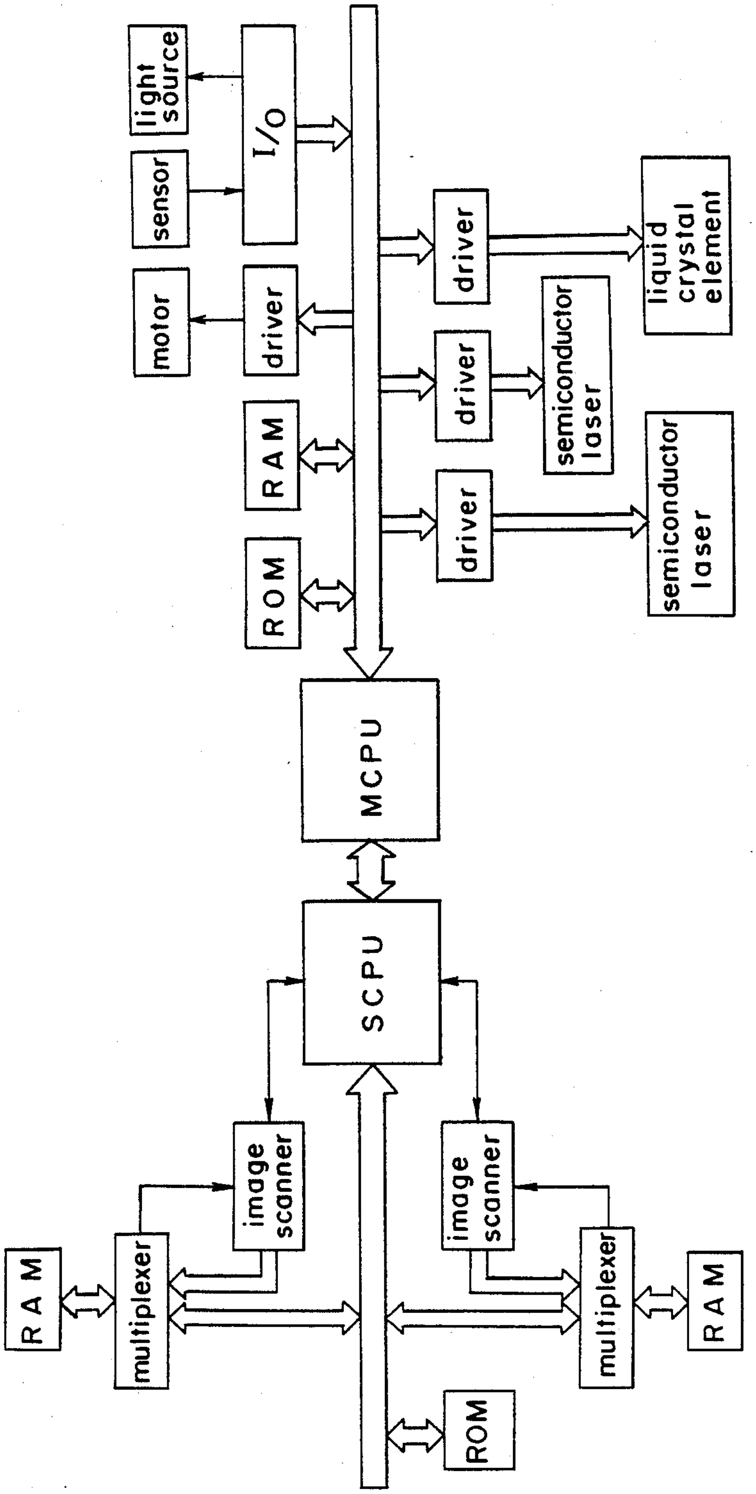
FIG. 7 is an electric block diagram of a control section employed in the apparatus.

FIG. 7 is a construction view of the controlling section for the image forming apparatus. A CPU is composed of an MCPU as a master CPU and an SCPU as a slave CPU. The MCPU effects a controlling operation for an optical system B, including a semiconductor laser apparatus and a liquid crystal element, and for an image forming process section C. Also, the SCPU effects a controlling operation for an image sensor, and an image scanner including a light source, etc. for document reading use. The driving operation of motor, etc. for the document transport use of the document processing section A is effected by the MCPU.

(6) Modified Example of First Embodiment

Figure 8:
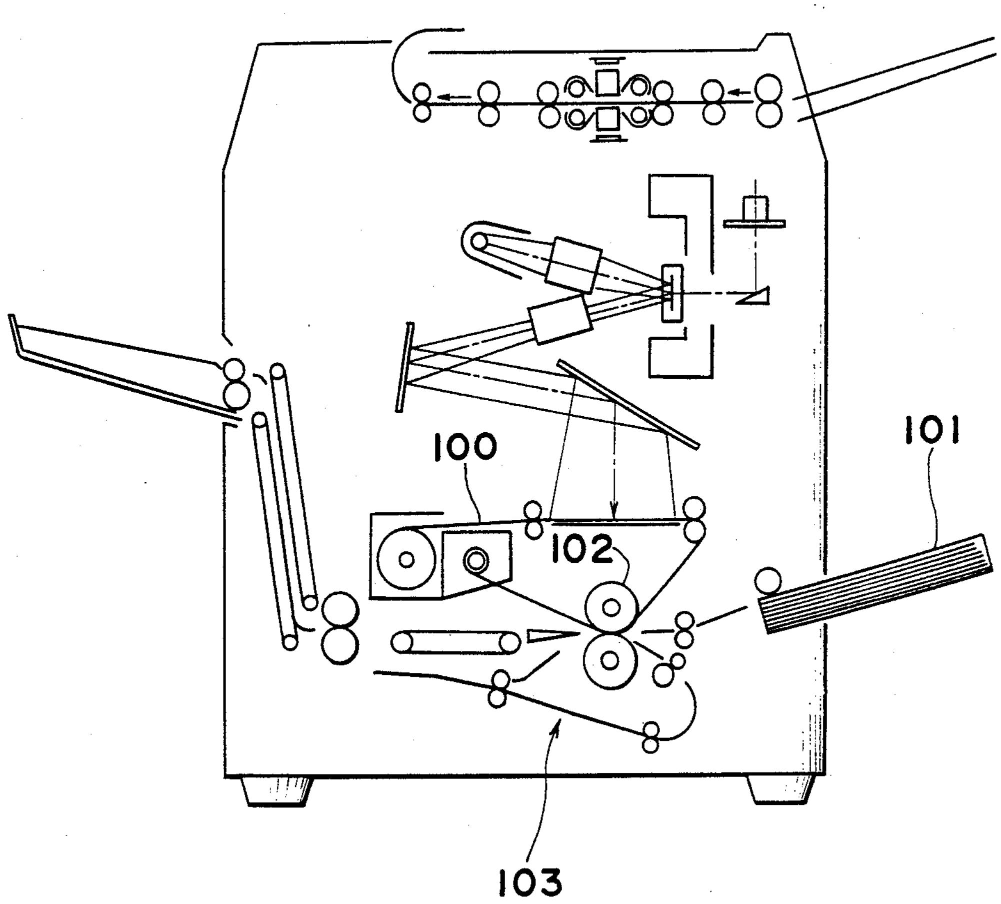
FIG. 8 shows a construction view in a modified example of the first embodiment.

FIG. 8 shows a modified example of the first embodiment. In the modified example, a light receptive sheet of a photosensitive, pressure-sensitive type and an image receiving sheet coated with a developing material are used in the image forming process section C. Namely, a roll-shaped light receptive sheet 100, coated with a micro-capsule including light hardening agent, colorless dye, etc. therein, a cut-sheet shaped image receiving sheet 101 coated with a developing material, and a pressure roller 102 for pressure-pressing two sheets, are used to expose the entire face of the original document image onto the light receptive sheet so as to form selective hardening images. The light receptive sheet 100 with the selective hardening images being formed thereon, and the light-receiving sheet 101 are depressed by the pressure roller 102. Thus, the unhardened micro-capsule bursts open to flow the included colorless dye to cause a color forming reaction with the developing material. Therefore, the colored images are formed on the image receiving sheet. Such an image forming process as described above is disclosed, for example, in Japanese Laid-Open Patent Publication Tokkaisho No. 58-88739. A duplex apparatus 103 is adapted to inverse the image receiving sheet 101.

According to the first embodiment of the present invention, the conventional RDH or similar apparatus is not required, and both the side faces of the original document may be read on one pass of the document into the original document reading section, because both the side faces of the original document are read from respective side face by the original document reading means. The present invention, in the first embodiment, has the advantage of the original document reading speed being increased and the construction of the original document transport system becoming simpler, thus resulting in less of a possibility that jamming will occur during the transport. In addition, the apparatus is not increased in scale, with the construction of the original document processing section actually being simplified.

As the original document images, which have been read, are adapted to be filled in by the laser on the element, (which is capable of being filled in with the laser heat through the electric heat optical effect) the original document images may be filled in in an extremely small area. When the element is exposed to the photosensitive member on a second document, the whole face exposure, instead of this slit exposure, may be effected at one time and the small optical system. The image forming process speed may be made extremely fast, and the original document reading speed becomes higher, and the whole image forming speed becomes increased considerably.

Furthermore, it is possible to optionally process the read original document images electrically.

Second Embodiment

Figure 9:
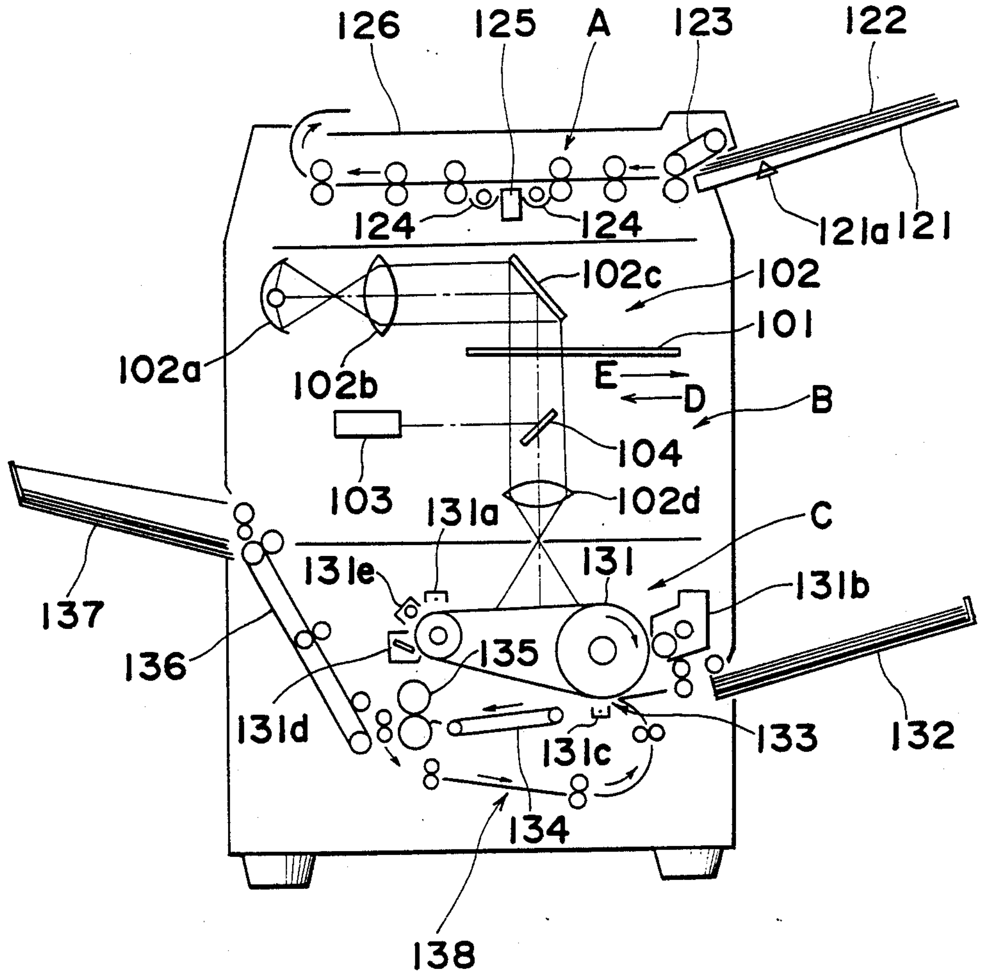
FIG. 9 is a schematic view of a copying machine in a second embodiment of the present invention.

FIG. 9 is a construction view of a copying machine in another embodiment of the image forming apparatus of the present invention.

Reference character A in FIG. 9 shows a document processing section; reference character B depicts an optical section including an element capable of being filled in with heat or light; and reference character C shows a copying (image forming) process section.

(1) Construction of Original Document Processing Section

In the original document processing section A, the document 122, which has been set on the original document tray 121, is fed, in the direction of the arrow as shown in the drawing, one by one from the top of the last page, by the transport roller 123. The image information of the original document thus fed, is read by the image reading apparatus (including a lamp 124 and an image sensor 125) and is stored once in the image memory. It is fed as is or after the optional processing of magnification conversion, color information conversion, etc. and is than fed into the semiconductor laser apparatus to be described later in the optical section B. The document 122, whose image information has been read, is then discharged onto the discharge tray 126. The setting of the original documents onto the original document platform 121 is detected by the original document detection sensor 121*a*.

(2) Construction of Optical Section

The optical section B comprises a memory plate 101; an exposure optical system 102 including a light source lamp 102*a*, a lens 102*b*, a reflection mirror 102*c*, a lens 102*d*; a semiconductor laser apparatus 103; and a dichroic reflection mirror 104. The semiconductor laser apparatus 103 illuminates laser light upon the memory plate 101 through the dichroic reflection mirror 104 in accordance with the image information to be sent from the image memory. The dichroic reflection mirror 104 reflects the laser beam, to be illuminated from the semiconductor laser apparatus 103, so as to transmit the light of the visual wavelength zone. The image is filled in on the memory plate through the illumination of the laser light. The exposure optical system 102 illuminates the transmitted light of the memory plate 101, with the images being filled in thereon, on a photosensitive member, to be described later, of the copying process section C.

FIG. 10 is a perspective view of a memory plate 101. The memory plate 101 has seven image filling-in sections 111-1 through 111-7 on which the image information is filled in by the semiconductor laser apparatus. The image filling-in sections 111-1 through 111-7 are composed of elements capable of being thermally filled in, which are composed of, for example nematic.cholesteric mixed liquid crystal.

FIG. 11 is a view showing a principle of filling-in the image information on the image filling-in sections 111

Figure 11A:
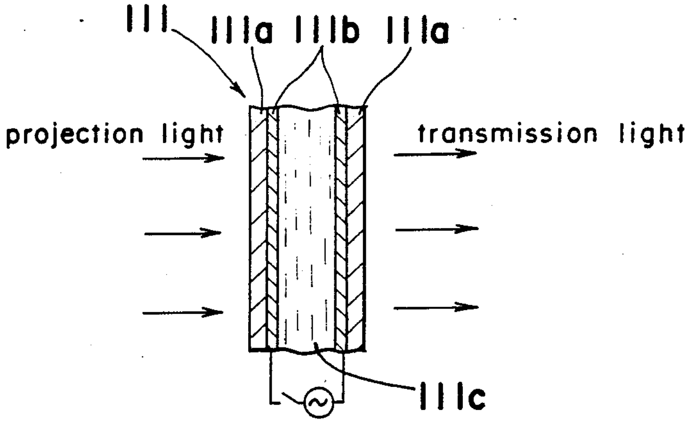
FIG. 11 is a schematic view showing a principle for filling in the image information onto the image filling-in sections of the machine, with FIG. 11(A) showing a condition before the image information is filled in, FIG. 11(B) showing a condition where laser beams are applied upon the image filling-in portion, and FIG. 11(C) showing a condition where a portion the laser beams are applied upon is frozen.
Figure 11B:
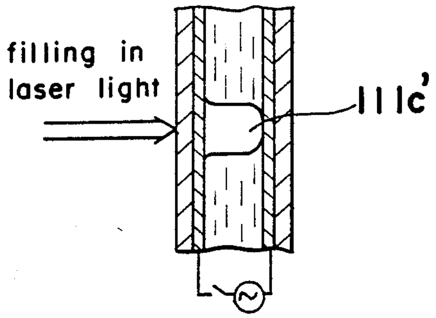
Figure 11C:
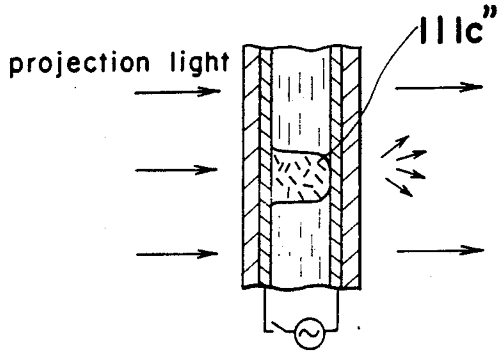

(111-1 through 111-7). The image filling-in section 111 has the nematic.cholesteric mixed liquid crystal 111c enclosed in between transparent glass plates 111a and transparent electrodes (indium oxide) 111b. FIG. 11(A) shows the condition of the liquid crystal prior to the image information being filled in. The image filling-in section 111 is transparent with the spiral shaft being in an order orientation condition vertical to the base plate surface. When the laser light is illuminated by the semiconductor laser apparatus, the liquid crystal becomes locally liquid in phase 111c' (FIG. 11(B)). When the laser is removed later, the liquid phase 111c' is quickly cooled, and frozen (FIG. 11(C)) as the cholesteric phase 111c'' disturbed in the orientation of the spiral shaft. The cholesteric phase 111c'' disturbed in the orientation scatters the light so as to appear, on the photosensitive member, as a dark point or a dark line when it has been placed in the exposure optical system 2 as shown in FIG. 9. Accordingly, when the laser light is filled in on the image filling-in section 111 in accordance with the image information by the semiconductor laser apparatus, the light with the portion illuminated by the laser light becomes a dark portion and is adapted to expose the photosensitive member. The voltage is not applied between the transparent electrodes 111b and 111b during the above-described filling-in operation. The AC voltage of several +V, several KHz are applied between the transparent electrodes 11b when the filled-in images are erased. The spiral shaft becomes vertical in order orientation condition with respect to the base plate surface as shown in FIG. 11(A). by the above-described principle, the filling-in of the images onto the image filling-in section 111, and the erasing, are effected.

Figure 12:
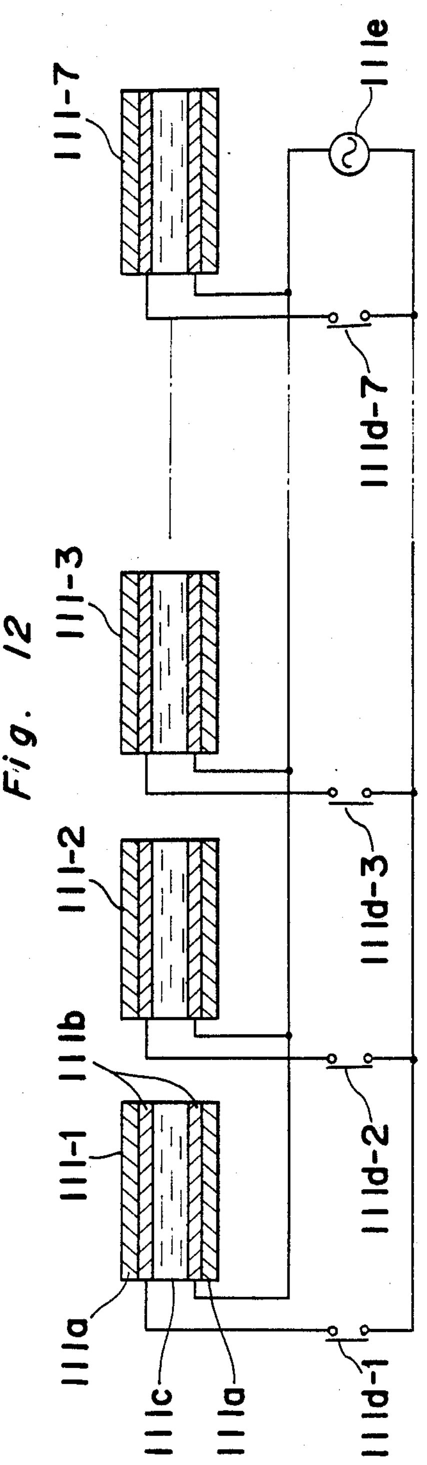
FIG. 12 is a circuit diagram for an image filling-in section of the machine.

FIG. 12 is a circuit diagram for image filling-in portions 111-1 through 111-7. The transparent electrodes 111b of the respective image filling-in portions 111-1 through 111-7 are connected in parallel relation with respect to the AC power supply 111e, so that the voltage is applied through the turning-on of the respective switches 111d-1 through 111d-7. The switches 111d-1 through 111d-7 are normally open, and are opened and closed by a coil (not shown). The switches 111d-1 through 111d-7 are turned on respectively when the images of the image filling sections 111-1 through 111-7 are erased, and the operation is started.

In FIG. 10, the image filling-in portions 111-1 through 111-7 are respectively secured onto a frame 112. A roller 115 for movement use is in pressure contact against the lower portion of the frame 112, while a motor 117 is in connection, through a belt 116, with the roller 115 used for movement. The frame 112, i.e., the memory plate 101 is moved in the directions of the arrow marks D and E by the driving of the motor 117. Convexes 113-1 through 113-7 are provided for detecting the positions, respectively, confronting the image filling-in sections 111-1 through 111-7. The convexes 113-1 through 113-7 are respectively different in length, with the convexes 113-1 through 113-7 being shorter in order. The convexes 113-1 through 113-7 are detected by the position detecting sensor 114. The motor 117 is controlled in accordance with the detection, with the memory plate 101 being positioned. Thus, any of the image filling-in sections 111-1 through 111-7 is positioned in the illuminating position of the laser light by the semiconductor laser apparatus 103, in the light path of the exposure optical system 102, with the filling-in of the images or the reading, i.e., transmission light exposure onto the photosensitive member, being effected. It is to be noted that the image filling-in section 111-1 is in the home position of the memory plate 101, with the image filling-in section 111-1 being located at the illuminating position of the laser light, the optical path of the exposure optical system 102.

(3) Construction of Copying Process Section

The copying process section C is provided with a photosensitive member 131 having a photoconductive property. The photosensitive member 131 is an endless belt, which is entrained between two rollers so as to be rotatably driven. Process apparatuses such as charging charger 131a, developing apparatus 131b, transfer charger 131c, cleaning apparatus 131d, power removing lamp 131e, etc. are provided around the photosensitive member 131. Also, a paper sheet cassette 132 is disposed to the right of the photosensitive member 131, with the paper sheet, for toner transfer use, being discharged onto the paper discharge tray 137 through a transfer section 133, a transport belt 134, a heat roller 135, and a transport belt 136. The lower portion of the transport belt 134 is of a paper sheet inversion system 138. The paper sheet with toner images being formed on the surface is inverted to front and the reverse by a switch back system so as to fed again into the transfer section 133.

The transmitted light of any of the image filling-in sections 111-1 through 111-7 of the memory plate 101 is applied, by the exposure optical system 2, upon the photosensitive member 131 discharged by the charging charger 131a so as to form the electrostatic latent image. Toner is applied onto the electrostatic latent image by the developing apparatus 131 to form the images. The toner images are transferred onto the paper sheet transported from the paper sheet cassette 132 so as to form images on the paper sheet. The paper sheet with the toner transferred thereon is fixed by the heat roller 135 so as to be discharged onto the paper sheet tray 137 through the transport belt 136.

(4) Construction of Operation Panel

Figure 13:
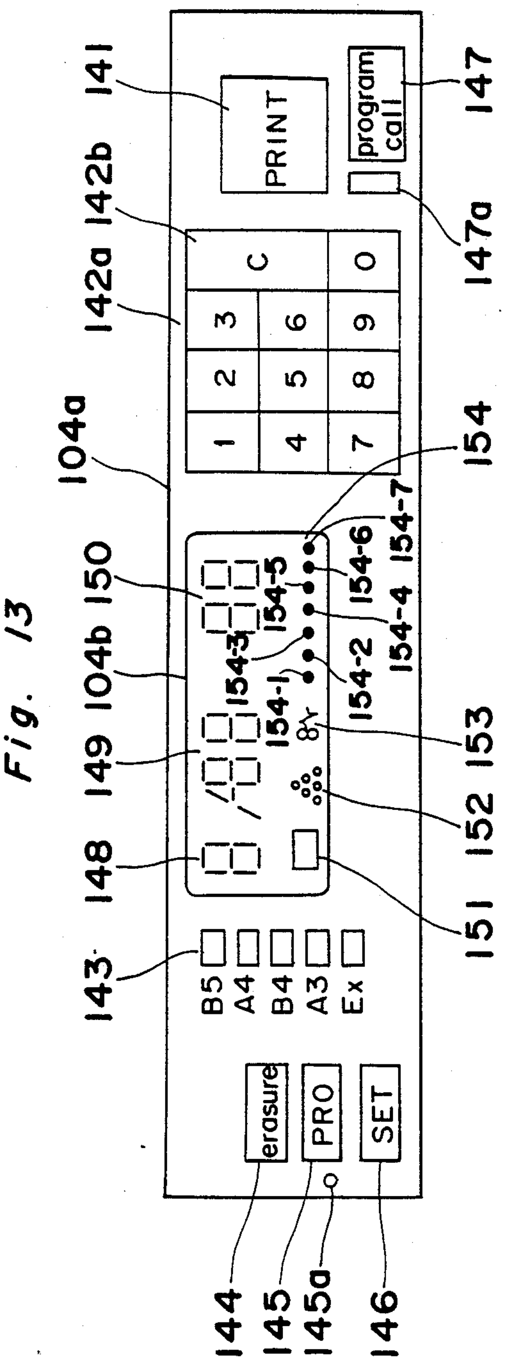
FIG. 13 is a plan view of an operation panel on the main body of the machine.

FIG. 13 is a view of an operation panel disposed on the top face of the copying machine main body.

The operation panel is composed of an operation section 104a and a display section 104b. The operation section 104a has a print switch 141 for instructing the copy action start; ten keys 142a for inputting the number of copy paper sheets and a clear key 142b for clearing the register number; a paper sheet size selection key 143 for selecting the size of the paper sheet to be fed onto the transfer section 133; an erasure key 144 for effecting the image erasing instruction (turning on of switches 111d-1 through 111d-7) of the image filling-in sections 111-1 through 111-7 of the memory plate 101; a mode setting key 145 for setting the program copying mode to be described later, and a lamp 145a to be lit at the program copying mode; a set key 146 for setting the program key inputted in the program copying mode; a call key 147 for calling the set program, and a lamp 147a to be lit during the program calling operation. Also, the display section 104b has an original document number display section 148 for displaying the number of the original documents to be copied; a paper sheet size display section 149; a copy paper sheet number display section 150 for displaying the number of copy paper sheets (number of copy editions) with respect to one sheet of document; a paper sheet supply display section 141 to be lit when the supply of the paper sheets is low; a toner supply display section 152 to be lit when the amount of toner is low; a jam display section 153 to be lit when the paper sheet jamming has occurred; and filling-in displays 154-1 through 154-7 for displaying the presence and absence of the filling-in of the images of the image filling-in sections 111-1 through 111-7 of the memory plate 101.

(5) Construction of Control Sections

Figure 15:
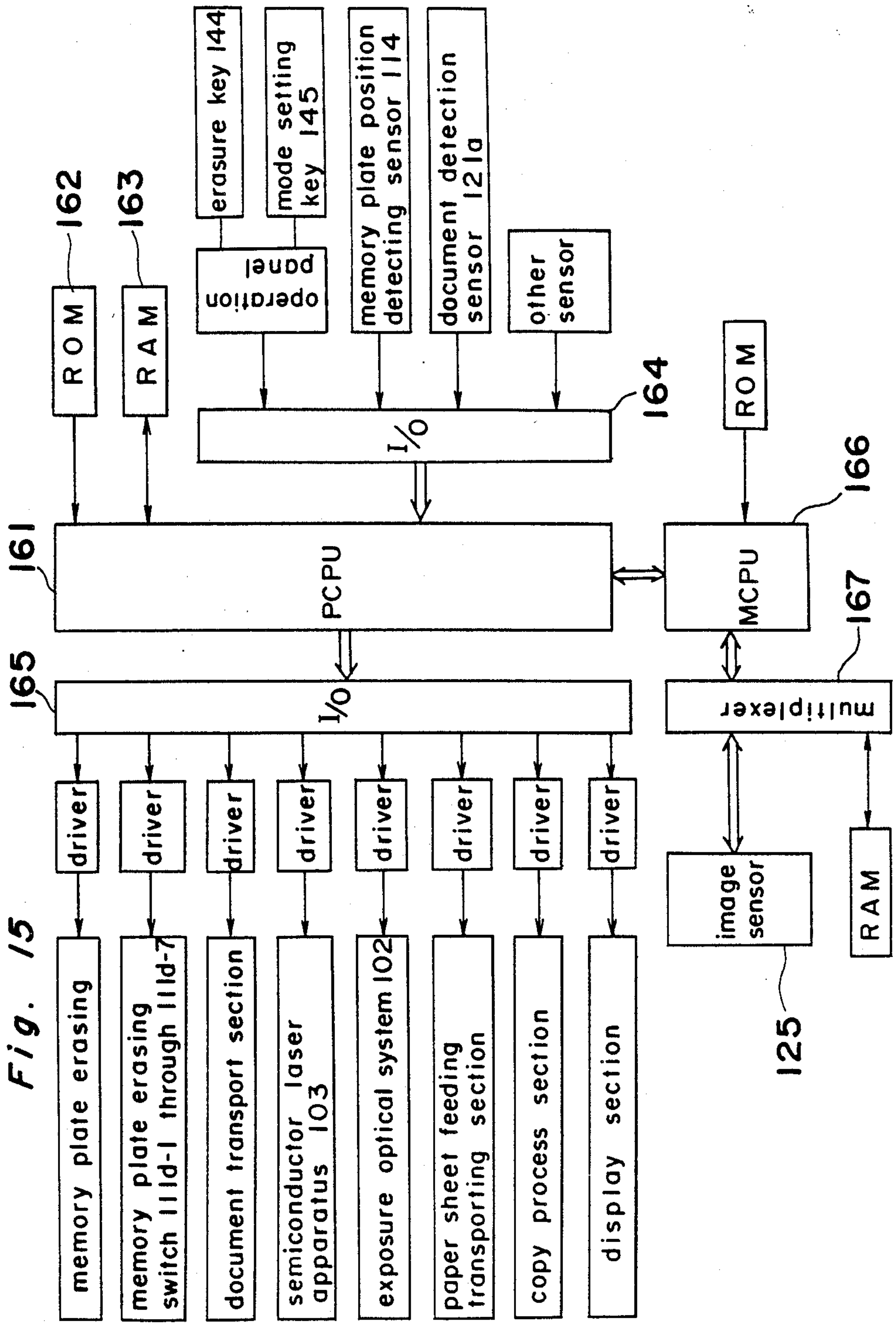
FIG. 15 is an electric block diagram of a control section of the machine.

FIG. 15 is a block diagram of the control section of the copying machine.

The whole control is effected by a PCPU 161, with the processing program being stored in advance in a ROM 162. A RAM 163 is a working area for program execution. The inputting operations from various input keys, sensors, etc. are effected through an I/O 164 to the PCPU 161, so as to output operation signals into drivers for the various operation sectors, through an I/O 165. An MCPU 166 for controlling the image sensor 125 is connected with the PCPU 161. The image sensor 125 is connected through a multiplexer 167 with the MCPU 166. The image information read by the image sensor 125 is fed into the image memory of the RAM 163, and is fed into the semiconductor laser apparatus 103 after the processings, when some processings are required.

FIG. 16 is a memory map for the RAM 163. The area is divided into memories M1 through M7, each having a paper sheet size memory section and a copy paper sheet number memory section. Also, flags F1 through F7 are disposed corresponding to the memories M1 through M7. The memories M1 through M7 and the flags F1 through F7 respectively correspond to the image filling-in sections 111-1 through 111-7. The paper sheet size memory section and the copy paper sheet number memory section are used for the program operation so as to store in memory, the sice of the paper sheet for forming the respective images and the number of paper sheets to be copied. For example, the respective paper sheet sizes and the number of paper sheets be copied are set individually so that the images of the image filling-in section 111-1 may be copied onto five sheets of A4 size paper and the images of the image filling-in sections 111-2 may be copied on three sheets of B5 size paper. Namely, the mode of the program at copying time is one for setting the paper sheet size and the number of paper sheet to be copied respectively corresponding to each of the image information, i.e., the image information taken from the document, filled in the image filling-in sections 111-1 through 111-7. The flags F1 through F7 are set when the image information has been filled-in in each of the image filling-in sections 111-1 through 111-7 so as to light the filling-in display sections 154-1 through 154-7 in accordance with the setting of the flags F1 through F7.

The positions of the image filling-in sections 111-1 through 111-7 of the memory plate 101 are inputted by the position detection sensor 114 into the PCPU 161, with the driving signals being outputted into the motor 117, if necessary. The image information of the first page through the seventh page is adapted to be filled in, respectively, in the image filling-in sections 111-1 through 111-7. For example, when the position of the image filling-in section is 111-1, as detected by position detection sensor 114, the image information of the first page is filled in on the image filling-in section 111-1, while the image information of the first page is being read by the image sensor 125. As the embodiment has seven image filling-in sections of 111-1 through 111-7, it is possible to read seven sheets of documents, or less, and to fill-in the image information thereof. However, it is also possible to read seven sheets of documents, or more, and to fill in the image information thereof, if the number of the image filling in sections is increased.

When the on signal of the erasure key 114 is outputted onto the PCPU 161, the switches **111*d*-1 through 111*d*-7, connected with the transparent electrodes 111*b* of the image filling in sections 111-1 through 111-7, are turned on so as to activate the image filling-in sections 111-1 through 111-7 into their transparent condition as shown in FIG. 11(A). This also acts to clear the memories M1 through M7, and to reset the flags F1 through F7 so as to turn off the filling-in display sections 154-1 through 154-7**.

(6) Operation Description

FIG. 17 is a flow chart showing a processing step for the copying operation in a copying machine constructed as described hereinabove. FIG. 17(A) shows a main routine; FIG. 17(B) shows a routine of the normal copying operation; and FIGS. 17(C) and 17(D) respectively show a routine at the program setting of the program copy and at the program copy.

Figure 17A:
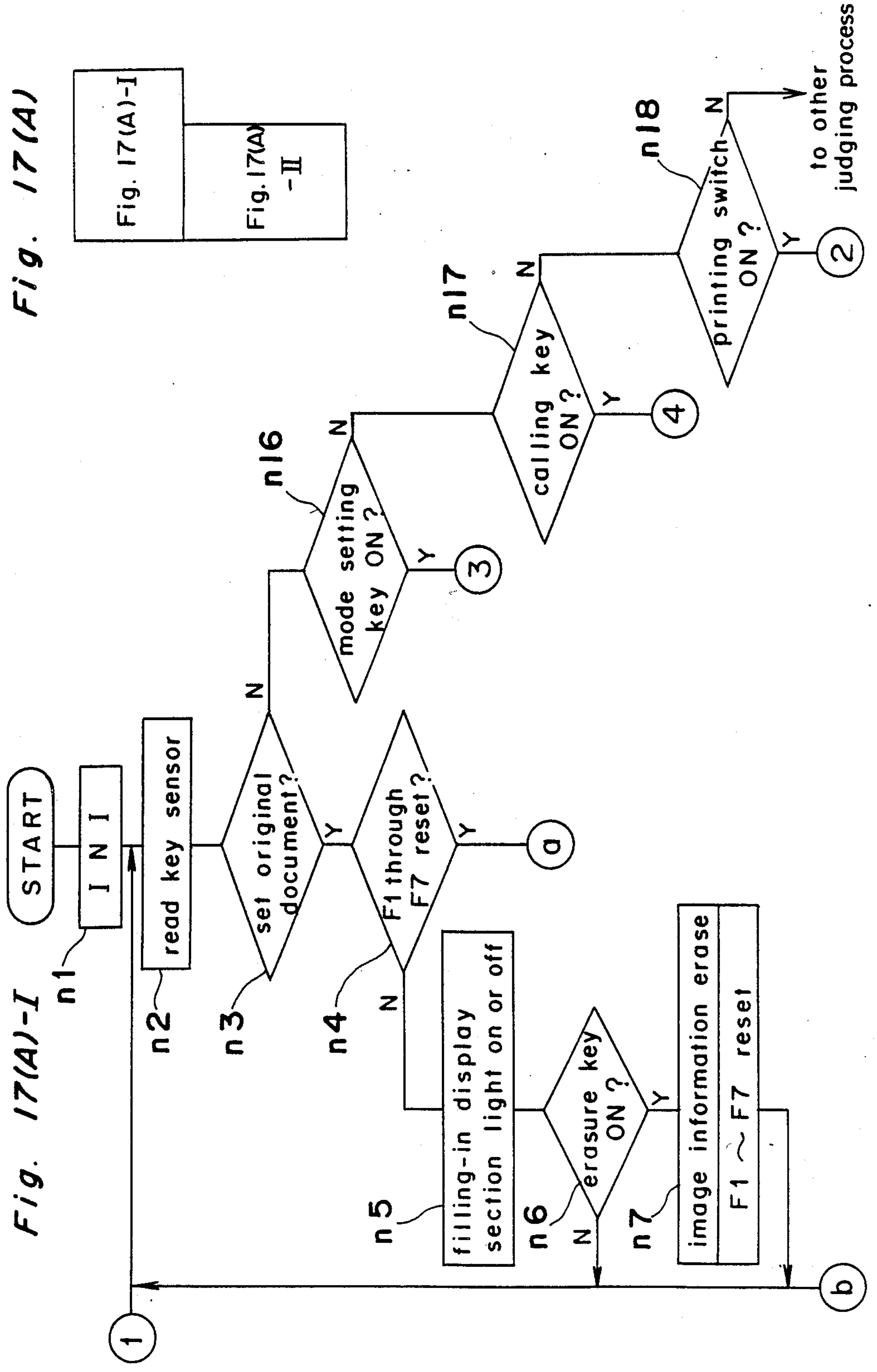
FIG. 17(A) to 17(D) are flow chart showing a copying processing procedure of the machine.

Referring to FIG. 17(A), when the power supply of the copying machine main body is turned on, the clearance of the variable of the copy paper sheets at step n1, the operation confirmation of the apparatus, the preliminary operation, etc. are set at the early stage. When these processings are completed, the various types of sensors, input keys, etc. are read at step n2. When the document 122 is set on the document tray 121 (at step n3), the setting condition of the flags F1 through F7 occurs, i.e., the presence and absence of the image filling-in into the image filling-in sections 111-1 through 111-7 judged at step n4. If any of the flags F1 through F7 is in the set condition, the filling-in display sections 154-1 through 154-7 are flashed at step n5 so as to notify the user of the image information filling-in operation. Thereafter, if an erasure key 144 is turned on, the switches **111*d*-1 through 111*d*-7 are turned on so as to clear the image filling-in sections 111-1 through 111-7, to clear the memories M1 through M7, and to reset the flags F1 through F7 (n6→n7). These processings are not effected unless the erasure key 144** is on. Accordingly, the image information may be prevented from being erased by mistake.

When the flags F1 through F7 are in a resetting condition, 0 is set in K0 showing the number of document sheets, and the memory plate 101 is moved to the home position. The original document on the original document tray 121 is delvvered to add (the number of the original document sheets is counted) 1 to the K0 (n8→n9→n10). Step n11, the image information of the original document is read by the image sensor 125 and is stored in the image memory. Thereafter, the optional processing is effected to feed the image information into the semiconductor laser apparatus 103 so as to effect the image information filling-in operation onto the selected image filling-in sections (any of 111-1 through 111-7). After the filling-in of the image information has been completed, the flag (any of F1 through F7) corresponding to the image filling-in section, with the filling-in operation having been effected therein, is set so as to light the corresponding filling-in display section. FIGS. 14(A) and 14(B) are views showing the display example of the display section **104*b* at this time. FIG. 14(A) shows a condition with the number of the original document sheets being a first, with FIG. 14(B) showing a condition with the number of the original document sheets being a second. Also, FIG. 14(C) shows a display example of the display section 104***b* when the filling-in operation (reading of the original document) of the image information onto the image filling-in section has been completed, with the image information of five sheets of paper being filled in, the paper sheet size and the number of the copying paper sheets being set at a standard condition (A4 size, one sheet). In order to change the copy paper sheet size and the number of the copy paper sheets, a paper sheet size selection key 143 and ten keys 142*a* need be operated. The number of the present original document sheets is displayed on the original document sheet number display section 148, with the filling-in display section corresponding to the image filling-in section filled in being lit.

When the filling-in operation of image information onto the image filling-in section has been completed, the memory plate 101 is moved and is located so that the next image filling-in section corresponds to the semiconductor laser apparatus 103. Also the presence and absence of the next document is judged (n13→n14). When the next document exists, the image information is read from the delivery of the document so as to repeat the filling-in operation for returning the memory plate 101 to the home position (step n15) if no original document exists. The image information is filled in by the image filling-in sections 111-1 through 111-7 in the above described manner.

Figure 17B:
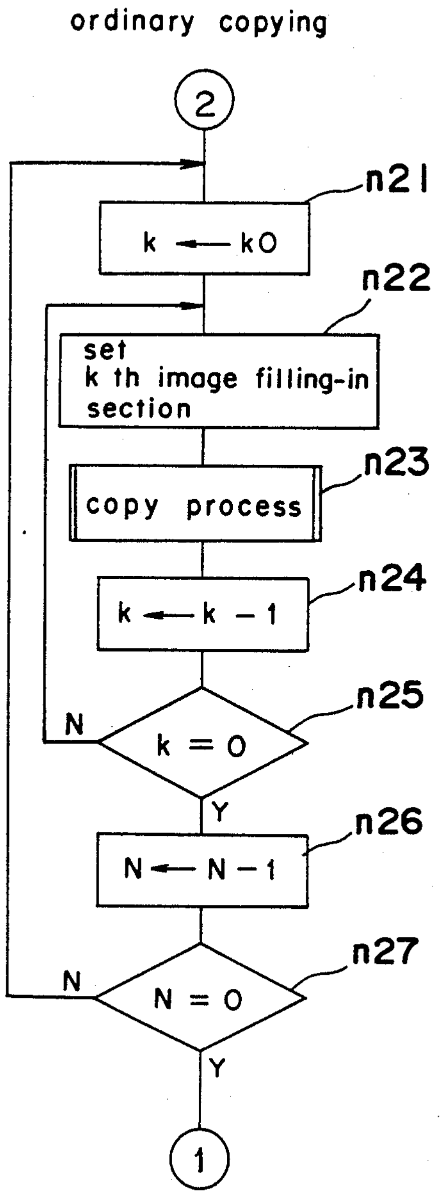
Figure 17C:
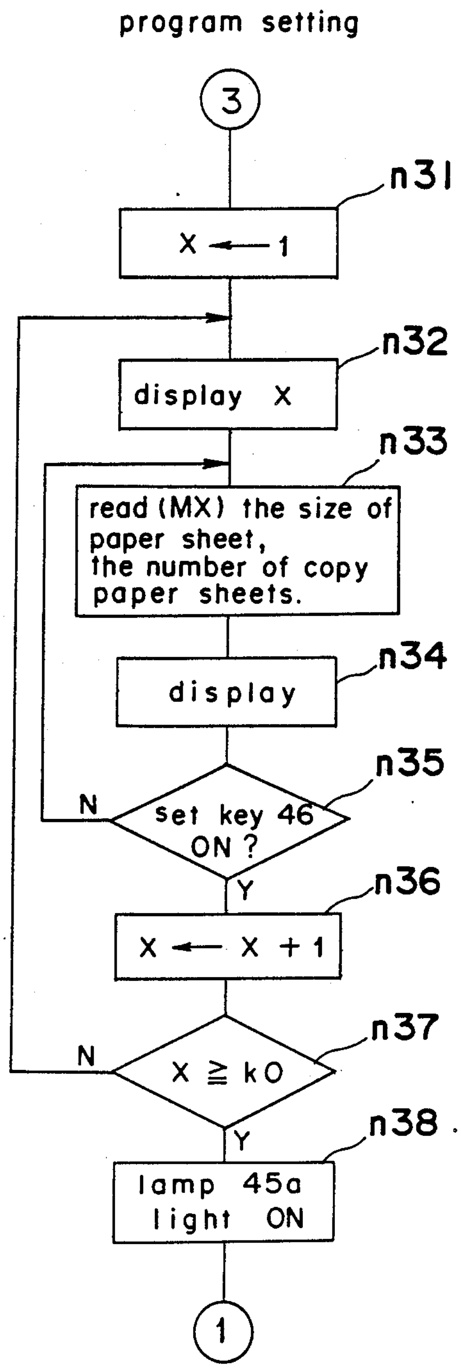

When a mode setting key 145 is judged as being on, at step n16, the routine proceeds to the program set shown in FIG. 17(C). Also, the routine proceeds into one during the program copying of FIG. 17(D) if a calling key 147 is judged as being on at step n17. The routine proceeds into one of the normal copy processing modes shown in FIG. 17(B) if the print switch 141 is judged as being on at step n18.

In FIG. 17(B), reference character K is a register numeral showing the position of the present image filling-in section, with reference character N showing a register numeral indicating the number of the copying editions. When the print switch 141 is turned on, K0, i.e., the number of the original document sheets filled in on the image filling-in section is inputted into K, with the Kth image filling-in section 111-(K) being set in the optical path of the exposure optional system 2 so as to effect the copy process (n21→n22→n23). The copy process is continued until the value of K becomes 0, i.e., the copying of the image filling-in sections 111-1(K) through 111-1 is effected, with the copy processing of one portion being completed when K has become 0 (n24→n25). The copy processing for each portion is continued until it reaches the number of the copy editions N to be inputted from the input key (steps n26, n27). The condition is restored to an input waiting, when the number of the copy editions has been completed. The copy processings of plural sheets of original documents (image filling-in sections) are effected, by a plurality of sheets, for each portion, so as to remove the requirement of the sorter system. Also, as the image information of the original document is copied by the movement of the memory plate 101 with the image information thereof being memorized on the image filling-in sections 111-1 through 111-7. The original document is not required to be circulated too often, thus, the original document may be prevented from being damaged.

In FIG. 17(C), reference character X is a register numeral showing the order of the memories M1 through M7. A mode setting key 145 is turned on, and 1 is set in the register X so as to disply the X (n31→n32). At step n33, the size of the paper sheets are entered the number of the copy paper sheets to be inputted from the paper sheet size selection key 143, and the ten keys 142*a* are read and stored in the memory M (X) so as to display them on the display section 104*b* at step n34. When the set key 146 is turned on, 1 is added to X so as to continue reading the size of the paper sheet and the number of the copy paper sheets with respect to M(X), until X becomes 0 (n35→n36→n37). Thus, the size of the paper sheet and the number of the copy paper sheets may be set, respectively, with respect to the image information memorized in the image filling-in sections (111-1 through 111-7). After the setting of the program is completed, the lamp 145*a*, for the program setting use, is lit at step n38.

Figure 17D:
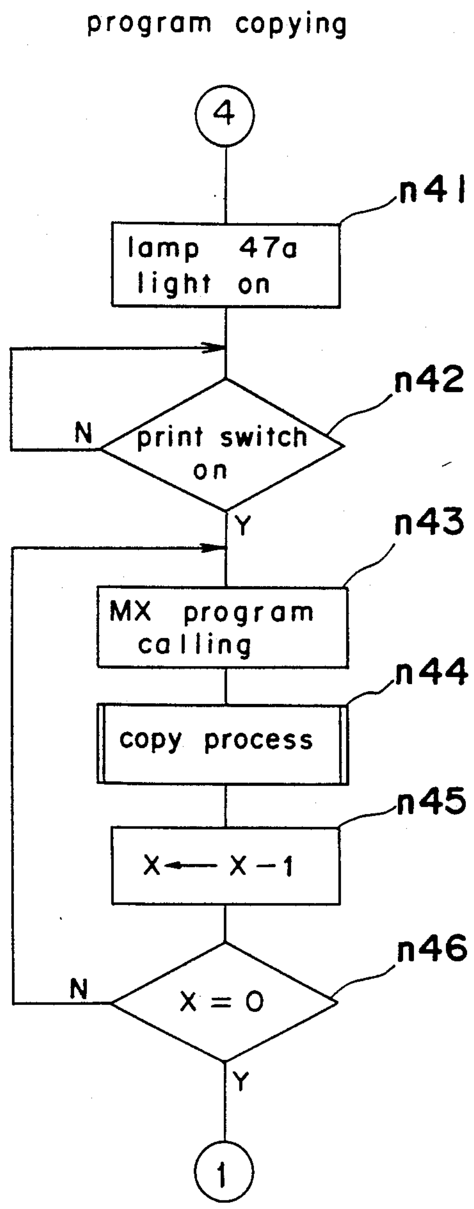

When a calling key 147 is turned on, the program proceeds to the routine of FIG. 17(D) so as to light the lamp 147*a*, showing a program calling-in at step n41. Thereafter when the print switch 141 is turned on, the paper sheet size and the copy paper sheet number memorized in M(X) are called so as to effect the copy processings of the image filling-in sections 111 (X) by the size of the paper sheet and the number of the copy sheets (n43→n44). For example, FIG. 14(D) shows a display example of the display section 104*b* when the paper sheet size and the copy paper sheet number stored in the memory M5 have been called, showing X, the paper sheet size (B5), and the copy paper sheet number (76). At step n45, X is subtracted. At step n46, the copy processings are effected in accordance with the calling of the program, and the program until X becomes 0.

The size of the paper sheet and the number of the papers sheets to be copied are set for each of the image information filled in on each of the image filling-in sections 111-1 through 111-7 so as to effect the copy processings.

Though the image filling-in sections are moved in the order of 111-7 through 111-1 so that the copy processing is adapted to be effected in this embodiment, the order of the copy processings may be optionally set. In this case, as the order of the copying operation may be easily changed only by the movement of the memory plate 101, the operation is simplified and the processing time may be made short.

Also, in this embodiment, although the nematic·cholesteric mixed liquid crystal is used as an element capable of image filling-in, any element with a photoconductive layer and a liquid crystal layer, a capable of being optically filled in through lamination, electrophotochromy, PLZT similar methods, may be used.

The "moving means for movably supporting the image filling-in sections," in the present invention, corresponds to a roller 115, a belt 116, and a motor 117; the "means for filling in the image information on a plurality of image filling-in sections" corresponds to an image sensor 125 for reading a image information, and the semiconductor laser apparatus 103; and the "optical means for optically reading the image information of the image filling-in section to focus into an image on the photosensitive material" corresponds to an exposure optical system 102.

Although a photosensitive member having photoconductivity of photosensitive material is used in the present embodiment, a photoreceptive sheet which coats the photosensitive microcapsule to be hardened through exposure may alternatively be used.

According to the second embodiment of the present invention, as the image forming processing for each portion may be effected only by the movement of the image filling-in section, with a plurality of image information being filled in on the image filling-in section, such a large-scale apparatus as a sorter is not required, thus, further decreasing the size of the apparatus. Also, if an machine is a copying one, the automatic feeding apparatus for the original document circulation is also not required. The original document is required to be fed only once, thus the original document may be less likely be damaged. Also, since the image may be formed through the full-face exposure of the image filling-in section, the copy processing may be increased.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus comprising:

optical image memory means, provided with a first frame and a second frame, for forming and storing an optical image by the use of radiation of a light beam;

image write-in means for writing images of a first original document and a second original document into the first frame and second frame of the optical image memory means, respectively;

moving means for moving the first frame to the write-in position facing the image write-in means when the image of the first original document is going be written into the first frame of the optical image memory means, and for moving the second frame to the write-in position forming the image write-in means when the image of the second original document is going to be written into the second frame of the optical image memory means;

image reading-out means disposed at a position facing the write-in position, provided with a light source, for radiating the image stored in the optical image memory means, onto a photosensitive material; and printing means for forming, onto a copying medium, an image corresponding to the light image radiated onto the photosensitive material by the image reading-out means.

2. The image forming apparatus as defined in claim 1, wherein the image write-in means and the light source of the image reading-out means are positioned opposite to each other with respect to the optical image memory means.

3. The image forming apparatus as defined in claim 1, wherein the optical image memory means is one selected from a group consisting of: an electro-liquid crystal having an optical heating effect; an element integrated with a light conductive layer and an electro-liquid crystal; and an electro-photochromy and PLZT.

4. An image forming apparatus comprising:

optical image memory means, provided with a first frame and a second frame, for forming and storing an optical image by the use of radiation of a light beam;

image write-in means for writing images of a first original document and a second original document into the first frame and second frame of the optical image memory, respectively;

first input means for commanding the start of operation of the write-in means;

moving means for moving the first frame to the write-in position facing the image write-in means when the image of the first original document is to be written into the first frame of the optical image memory means, and for moving the second frame to the write-in position facing the image write-in means when the image of the second original document is to be written into the second frame of the optical image memory means;

image reading-out means provided with a light source for radiating the image stored in the first frame of the optical image memory means onto a photosensitive material, and disposed at a position facing the write-in means;

printing means for forming, onto a copying medium, an image corresponding to the light image radiated onto the photosensitive material by the image reading-out means;

second input means for commanding the start of operations of the image reading-out means and printing means in order to form, onto the copying medium, the image written into the second frame of the optical image memory means upon operation of the image reading-out means and printing means; and control means for controlling the image reading-out means and printing means to operate in response to the input of the second input means, and for controlling the image write-in means to operate in response to the input of the first input means.

5. The image forming apparatus as defined in claim 4, further comprising:

erase means for erasing the image written into the optical image memory means; and command means for starting the operation of the erase means.

6. The image forming apparatus as defined in claim 4, further comprising:

information memory means for storing a first flag indicating whether or not an image is formed in the first frame of the optical image memory means, and a second flag indicating whether or not an image is formed in the second frame of the optical image memory means; and indication means for indicating whether or not an image is formed, in response to the first flag and second flag of the information memory means.

7. The image forming apparatus as defined in claim 1, further comprising:

detection means for detecting the position of the optical image memory means.

8. An image forming apparatus comprising:

original read-in means for reading in the image of an original document;

original tray means for setting a plurality of original documents for reading the images thereof;

detection means for detecting whether or not an original document is set onto the original tray means;

feed means for feeding the original documents set onto the original tray means, in sequential order, onto the original read-in means;

optical image memory means, provided with a plurality of frames for forming and storing an optical image by the use of radiation of a light beam;

image write-in means for writing images of the original documents fed to the original read-in means, in sequential order, into the respective frames of the optical image memory means;

moving means for moving each of the respective frames to the write-in position facing the image write-in means when the image of an original document is going to be written into one of the frames of the optical image memory means;

image read-out means provided with a light source for radiating, with a light beam, the images stored in the optical image memory means onto a photosensitive material;

printing means for forming an image corresponding to the light image radiated onto said photosensitive material on a copy medium; and control means for controlling the movement by the moving means for the frame of the optical image memory means having been stored onto a first sheet of the copying medium, to move the frame to the position facing the image read-out means when there is no original document to be written-in, as detected by the detection means.

9. The image forming apparatus as defined in claim 8, wherein the image read-out means is located at a position facing the image write-in means.

10. The image forming apparatus as defined in claim 8, further comprising a second control means for controlling the feeding, in sequential order, of the original documents from the original tray means and to write-in the images of the original documents into the optical image memory means when there is an original document on the original tray means upon detection thereof by the detection means.

11. An image forming apparatus comprising:

original read-in means for reading in the image of an original document;

input tray means for holding a plurality of original documents for reading the images thereof;

detection means for detecting the presence of an original document which has been set on the input tray means;

feeding means for feeding original documents on the input tray means, in sequential ordere, onto the original read-in means;

optical image memory means provided with a plurality of frames for forming and storing an optical image by the use of radiation of a light beam;

information memory means for storing a flag indicating whether or not an image has been written-in to the optical image memory means;

image write-in means for writing-in the images fed to the original read-in means, in sequential order, into the respective frames of the optical image memory means;

moving means for moving one of the frames to the write-in position facing the image write-in means when the image of the original document is going to be written into one of the frames of the optical image memory means;

image read-out means provided with a light source for radiating the image stored in the optical image memory means, with a light beam, onto a photosensitive material;

printing means for forming an image corresponding to the light image radiated onto the photosensitive material onto a copying medium;

warning means for generating a warning signal; and control means for detecting the presence of a flag in the information memory means when the setting of the original document on the input tray means is detected by the detection means, wherein when it is detected that there is no image written-in to the optical image memory means, the operation of image write-in means is permitted, and, when it is determined that the image of an original document is written-in to the optical image memory means, the warning means is actuated.

12. The image forming apparatus as defined in claim 11, wherein the image read-out means is located at a position facing the image write-in means.

13. The image forming apparatus as defined in claim 12, wherein the warning means comprises an indicating means.

14. An image forming apparatus comprising:

optical image memory means provided with a first frame and a second frame for forming and storing an optical image by means of radiation of a light beam;

image write-in means for writing-in images corresponding to a first original document and a second original document, respectively, into the first frame and second frame of the optical image memory means;

moving means for moving the first frame to the write-in position facing the image write-in means when the image of the first original document is going to be written into the first frame of the optical image memory means, and for moving the second frame to the write-in position facing the image write-in means when the image of the second original document is going to be written into the second frame of the optical image memory means;

first input means for inputting a copying condition;

copy condition memory means including, first condition memory frame for storing an image forming condition with respect to the images having been written-in in the first frame upon being input by the first input means, and second condition memory frame for storing an image forming condition with respect to the images having been written-in in the second frame upon being input by the first input means;

second input means for indicating the start of image forming on the basis of the images having been written-in to the optical image memory means;

image read-out means provided with a light source for radiating, with a light beam, the images stored in the optical image memory means onto a photosensitive material;

printing means for forming an image corresponding to the light image radiated onto the photosensitive material onto a copying medium; and control means for controlling the forming of images by controlling the operations of the moving means, image read-out means and printing means so as to obtain a copy related to the copying condition having been stored in the copy condition memory means in response to the signal from the second input means.

15. The image forming apparatus as defined in claim 14, wherein the image read-out means is located at a position facing the image write-in means.

16. The image forming apparatus as defined in claim 14, further comprising a call command means for commanding the calling-up of the copying condition in order to execute the copying operation in accordance with the copying condition having been stored in the copy condition memory means.

17. The image forming apparatus as defined in claim 14, wherein the copy condition memory means is adapted to store the size of a selected copying medium and a selected number of sheets of copying medium.

18. An image forming apparatus comprising:

duplex scanning means for simultaneously scanning both sides of a document and generating information signals representative of information on both sides of the document;

memory means for separately storing said information signals for each side of the document, in response to said scanning means;

laser means for outputting light representative of said stored information signals, in response to receiving said stored information signals for each side of said document;

multiple image fill-in means, each for storing image information representing one side of said document, in locations where light is received from said laser means;

exposure means for projecting light onto a respective ones of said multiple image fill-in means, to expose said stored information;

photosensitive means for receiving and storing said exposed information in response to said exposure means;

copying means for copying said information stored on said photosensitive means onto one side of a recording medium;

inversion means for inverting said recording medium so as to expose a second side of said medium;

control means for controlling said exposure means to project light onto a second of said multiple image fill-in means;

said photosensitive means receiving and storing said exposed information from said second image fill-in means; and said copying means copying said information stored on said photosensitive means onto a second side of a recording medium, thereby producing a two-sided copy of the original document.

19. An apparatus, as claimed in claim 18, wherein said laser means comprise multiple lasers, each for outputting light in response to receiving stored information signals for a different side of said document.

20. An apparatus, as claimed in claim 18, wherein each said multiple image fill-in means is comprised of smectic liquid crystal elements, which, after receiving laser light, reacts so as to form an opaque area upon removal of said laser light.

21. An apparatus, as claimed in claim 18, further comprising:

erasure means for erasing said image information stored on said multiple image fill-in means.

22. An apparatus, as claimed in claim 21, wherein said erasure means consists essentially of means for applying voltage to said multiple image fill-in means to thereby erase said stored information.

23. An apparatus, as claimed in claim 18, further comprising:

erasing means for erasing said stored information on said smectic liquid crystal elements by applying a voltage to said smectic liquid crystal elements.

24. An apparatus, as claimed in claim 18, wherein said exposure means comprises:

light means for exposing light onto said multiple image fill-in means to expose said stored information; and reflecting means for reflecting said exposed information onto said photosensitive means.

25. An apparatus, as claimed in claim 18, wherein said duplex scanning means comprises two image scanners situated opposite each other so as to simultaneously scan both sides of a document image.

26. An apparatus for forming a dual-sided copy of a dual sided document, said apparatus comprising:

first reading means for simultaneously reading both sides of a dual-sided document and generating information signals representative of information of both sides of the document;

memory means for storing said generated information signals in response to said reading means;

writing means for writing information in response to receiving information from said memory means;

multiple storage means, each for storing written information representative of a different one of said sides of said dual-sided document, in response to said writing means;

exposure means for sequentially exposing said stored written information from each of said multiple storage means;

copying means for sequentially copying said exposed information onto a first side, and then onto a second side of a recording medium in response to said exposure means, thereby creating a dual-sided copy of said dual-sided document.

27. An apparatus as claimed in claim 26, wherein said writing means comprises a laser.

28. An apparatus as claimed in claim 27, wherein said multiple storage means comprises two smectic liquid crystal elements, each for storing information of a different one of the sides of a dual-sided document.

29. An apparatus as claimed in claim 28, wherein said copy means comprises:

photosensitive means for storing said exposed information;

transfer means for transferring said stored information to a first side of said recording medium;

inversion means for inverting said recording medium to its second side; and said transfer medium then transferring information to the second side of said recording medium.

30. An image forming apparatus capable of forming images of multiple input documents, each document capable of being formed onto a different size recording medium and capable of being formed a different number of a multiple of times, the apparatus comprising:

programming means for setting information representing a desired recording medium size and a desired number of images to be formed, for each of a plurality of input documents;

scanning means for sequentially scanning each of a plurality of documents and generating information signals representative of each said plurality of documents;

memory means for storing said desired recording medium-size, said desired number of images to be formed, and said generated information signals, for each of said plurality of documents, in response to said programming means and said scanning means;

laser means for outputting laser light in response to receiving said generated information signals from said memory means;

means fill-in means comprising multiple storage frames, each for storing information in response to receiving said laser light from said laser means;

control means for controlling said memory means to sequentially output generated information, for each of said plurality of documents, to said laser means and for simultaneously controlling said image fill-in means to store information in each of said multiple frames in a sequential manner, with each of said frames corresponding to a different input document;

exposure means for exposing each of said multiple storage frames of said image fill-in means, in a sequential manner;

said control means controlling said sequential exposure of said multiple storage frames in response to said information set, for each of said plurality of documents, by said program means;

copying means for copying said exposed information onto a recording medium to create a copy for each of said plurality of documents;

said control means controlling said copying means to copy said exposed information, in a sequential manner, in response to said information set, for each of said plurality of documents, by said program means.

31. An apparatus, as claimed in claim 30, wherein each of said multiple frames of said image fill-in means comprises a smectic liquid crystal element which forms an image in response to laser light being applied to the element and then being removed.

32. An apparatus, as claimed in claim 31, wherein said exposure means comprises:

light means for generating light;

lens means for focusing said generated light onto said image fill-in means so as to expose the image formed on said image fill-in means; and further lens means for focusing said exposed image.

33. An apparatus, as claimed in claim 32, wherein said copying means comprises:

photosensitive means for receiving said exposed image from said exposure means and for storing said exposed image;

developing means for developing said stored image;

transfer means for transferring said developed image to a recording medium, thus creating a copy upon receipt from said developing medium; and output means for outputting said copy.

34. An apparatus, as claimed in claim 31, further comprising:

erasure means for erasing information stored in each of said multiple storage frames of said image fill-in means.

35. An apparatus, as claimed in claim 34, wherein said erasure means comprises means for applying voltage to each of said smectic crystal elements to thereby erase stored information.

36. An apparatus, as claimed in claim 34, further comprising: indicating means for indicating whether or not any of said multiple storage frames of said image fill-in means has information stored therein; and warning means for indicating that information is stored in one or more of said multiple storage frames of said image fill-in means, at the time of initial programming.

37. An apparatus, as claimed in claim 30, further comprising:

belt and roller means, connected to said image fill-in means, for allowing movement of each of said multiple storage frames of said image fill-in means;

motor means for actuating movement of said belt and roller means to move said multiple storage frames of said image fill-in means; and said control means, in response to said information set by said programming means, controlling said motor to operate so as to move each of said respective multiple storage frames of said image fill-in means into position so as to receive laser light and store information corresponding to each of said respective plurality of documents on each of said respective corresponding multiple storage frame.

* * * * *